United States Patent
Kraus et al.

(10) Patent No.: US 11,347,783 B2
(45) Date of Patent: *May 31, 2022

(54) IMPLEMENTING A SOFTWARE ACTION BASED ON MACHINE INTERPRETATION OF A LANGUAGE INPUT

(71) Applicant: Oracle International Corporation, Redwood Shores, CA (US)

(72) Inventors: William Kraus, Bainbridge Island, WA (US); Jeremy Ashley, San Francisco, CA (US); Jatin Thaker, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/039,908

(22) Filed: Sep. 30, 2020

(65) Prior Publication Data

US 2021/0019341 A1 Jan. 21, 2021

Related U.S. Application Data

(63) Continuation of application No. 14/956,248, filed on Dec. 1, 2015, now Pat. No. 10,831,811.

(51) Int. Cl.
*G06F 16/36* (2019.01)
*G06F 16/242* (2019.01)
*G06F 16/33* (2019.01)

(52) U.S. Cl.
CPC .......... *G06F 16/367* (2019.01); *G06F 16/243* (2019.01); *G06F 16/3344* (2019.01); *G06F 16/3346* (2019.01)

(58) Field of Classification Search
CPC .. G06F 16/367; G06F 16/243; G06F 16/3344; G06F 16/3346; G06F 40/279; G06F 16/3338; G06Q 10/105
See application file for complete search history.

(56) References Cited

U.S. PATENT DOCUMENTS 7,284,196 B2 10/2007 Skeen
7,502,730 B2 3/2009 Wang
(Continued)

OTHER PUBLICATIONS

Kesorn, Kraisak et al.; "Semantic Restructuring of Natural Language Image Captions to Enhance Image Retrieval"; obtained at http://www.academypublisher.com/jmm/vol04/no05/jmm0405284297.pdf; 14 pages; Oct. 2009.
(Continued)

*Primary Examiner* — William B Partridge
*Assistant Examiner* — Fatima P Mina
(74) *Attorney, Agent, or Firm* — Trellis IP Law Group, PC

(57) ABSTRACT

A schema-ontology is automatically constructed with reference to implicit sematic relationships of a database schema. An estimation of the meaning of the language input is determined based on the language input and the schema-ontology. The machine interpretation of the language input is generated based on the meaning and based on the estimation of the meaning including an estimation of an ambiguity of portions of the language input. A software action that is responsive to the machine interpretation of the language input is selected. The software action is implemented based on the machine interpretation of the language input.

20 Claims, 10 Drawing Sheets

(56) References Cited

U.S. PATENT DOCUMENTS

| | | | |
|---|---|---|---|
| 7,899,666 B2 | 3/2011 | Varone | |
| 7,991,760 B2 | 8/2011 | Kolz | |
| 8,036,876 B2 | 10/2011 | Sanfilippo | |
| 8,407,162 B2 | 3/2013 | Devitt | |
| 8,429,179 B1 * | 4/2013 | Mirhaji | G06F 16/22 |
| | | | 707/756 |
| 8,938,406 B2 | 1/2015 | Dutt | |
| 2004/0117189 A1 * | 6/2004 | Bennett | G09B 5/04 |
| | | | 704/E15.04 |
| 2006/0184473 A1 * | 8/2006 | Eder | G06N 5/022 |
| | | | 706/20 |
| 2011/0307435 A1 * | 12/2011 | Overell | G06F 16/3344 |
| | | | 706/46 |

OTHER PUBLICATIONS

Freitas, Andre', et al.; "A Semantic Best-Effort Approach for Extracting Structured Discourse Graphs from Wikipedia"; obtained at http://ceur-ws.org/Vol-906/paper8.pdf; 12 pages; download circa Jul. 13, 2015.

Karanastasi, Anastasia, et al.; "OntoNL: An Ontology-based Natural Language Interaction Generator for Multimedia Repositories" obtained at http://www.music.tuc.gr/GetFile?FILE_TYPE=PUB.FILE&FILE_ID=117; 10 pages; downloaded circa Jul. 13, 2015.

Wu, Jiewen et al., "A Study of Ontology-based Query Expansion", obtained at https://cs.uwaterloo.ca/research/tr/2011/CS-2011-04.pdf; 38 pages; downloaded circa Jul. 13, 2015.

* cited by examiner

IMPLEMENTING A SOFTWARE ACTION BASED ON MACHINE INTERPRETATION OF A LANGUAGE INPUT

CROSS REFERENCES TO RELATED APPLICATIONS

This application is a continuation of U.S. patent application Ser. No. 14/956,248, entitled RESOLUTION OF AMBIGUOUS AND IMPLICIT REFERENCES USING CONTEXTUAL INFORMATION, filed on Dec. 1, 2015 which are incorporated by reference as if set fourth in full in this application for all purposes.

This application is related to the following U.S. patent application Ser. No. 13/715,776, entitled NATURAL LANGUAGE PROCESSING FOR SOFTWARE COMMANDS, filed on Dec. 14, 2012.

U.S. patent application Ser. No. 13/842,982, entitled SYSTEM FOR ACCESSING SOFTWARE FUNCTIONALITY, filed on Mar. 15, 2013.

U.S. patent application Ser. No. 14/033,052, entitled ENHANCED VOICE COMMAND OF COMPUTING DEVICES, filed on Sep. 20, 2013.

U.S. patent application Ser. No. 14/475,344, entitled CONTEXT AWARE VOICE INTERFACE FOR COMPUTING DEVICES, filed on Sep. 2, 2014 which are incorporated by reference as if set fourth in full in this application for all purposes.

BACKGROUND

The present application relates to computing and more specifically to software and accompanying systems and methods for interpreting software input, such as natural language input, including resolving ambiguity therein.

Systems that facilitate resolving ambiguity in inputs, including systems for interpreting natural language, are employed in various demanding applications, including voice-based personal assistants, foreign language translation software, voice-based mobile enterprise applications, language control of software and hardware systems (e.g., robotics), search engines, and so on. Such applications often demand accurate user friendly mechanisms for quickly interpreting natural language inputs and providing useful responses based on the input.

Systems and methods for accurately interpreting natural language input are particularly important in enterprise applications that employ enterprise databases in combination with natural language user interfaces, where inefficient or inaccurate natural language translation or interpretation can be particularly costly. Inaccurately interpreted natural language input, e.g., commands, queries, and so on, used to interact with enterprise software, can inhibit enterprise task completion and accuracy and efficiency, thereby increasing business costs and frustrating users.

Conventionally, to facilitate machine interpretation of natural language input or other potentially ambiguous input, so-called "big data" approaches are often employed. An example big data approach involves analyzing a substantially unstructured large dataset to extract statistical patterns between input (e.g., input phrases) and context information (also called contextual information or contextual data herein). The statistical patterns may then be combined with potentially applicable context information to estimate or guess what the input refers to; then to perform an action (e.g., run a query) based on the guess.

However, such statistical methods can be computationally expensive, unreliable, and problematic for many enterprise applications, where more certainty is desirable. In addition, the underlying data needed for such statistical methods may be unavailable to many enterprise applications.

SUMMARY

Rather than using conventional approaches involving analysis of statistical patterns in data to decipher potential meanings of potentially ambiguous system inputs, certain embodiments discussed herein exploit the domain knowledge and rules found in a database schema, such as the schema of a CRM or HCM database, to construct an ontology that describes the semantic relationships between a user and other relevant entities. Then, the strength of those relationships and contextual information can be used to construct a Bayes network for predicting the likelihood that a word, phrase, or other potentially ambiguous input (i.e., reference token) refers to a particular entity.

Hence, certain embodiments discussed herein facilitate resolving ambiguity in computing system input, such as natural language input, where excess ambiguity can be problematic. By leveraging knowledge of a computing domain and associated database to interpret the input, e.g., natural language input, in combination with a mechanism for predicting the reliability and/or relevance of a particular interpretation, computing systems can now rapidly, consistently, and accurately interpret potentially ambiguous input. This further alleviates the need for a user to be particularly explicit when providing system input, as the underlying system is relatively efficient and accurate at interpreting even vague references.

Such accurate and efficient interpretations of potentially ambiguous input (e.g., natural language input) can further enable precise selection of responsive software actions, e.g., scheduling an appointment, making a note for a particular opportunity or client account, and so on. For example, an enterprise user may provide input that is associated with a particular opportunity, the opportunity of which is associated with additional information, e.g., location information. This additional information can then be fed to a rules-based expert system trained to make suggestions as to what the user may wish to accomplish next. This will help to streamline user experience.

A further understanding of the nature and the advantages of particular embodiments disclosed herein may be realized by reference of the remaining portions of the specification and the attached drawings.

DETAILED DESCRIPTION OF EMBODIMENTS

Figure 1:
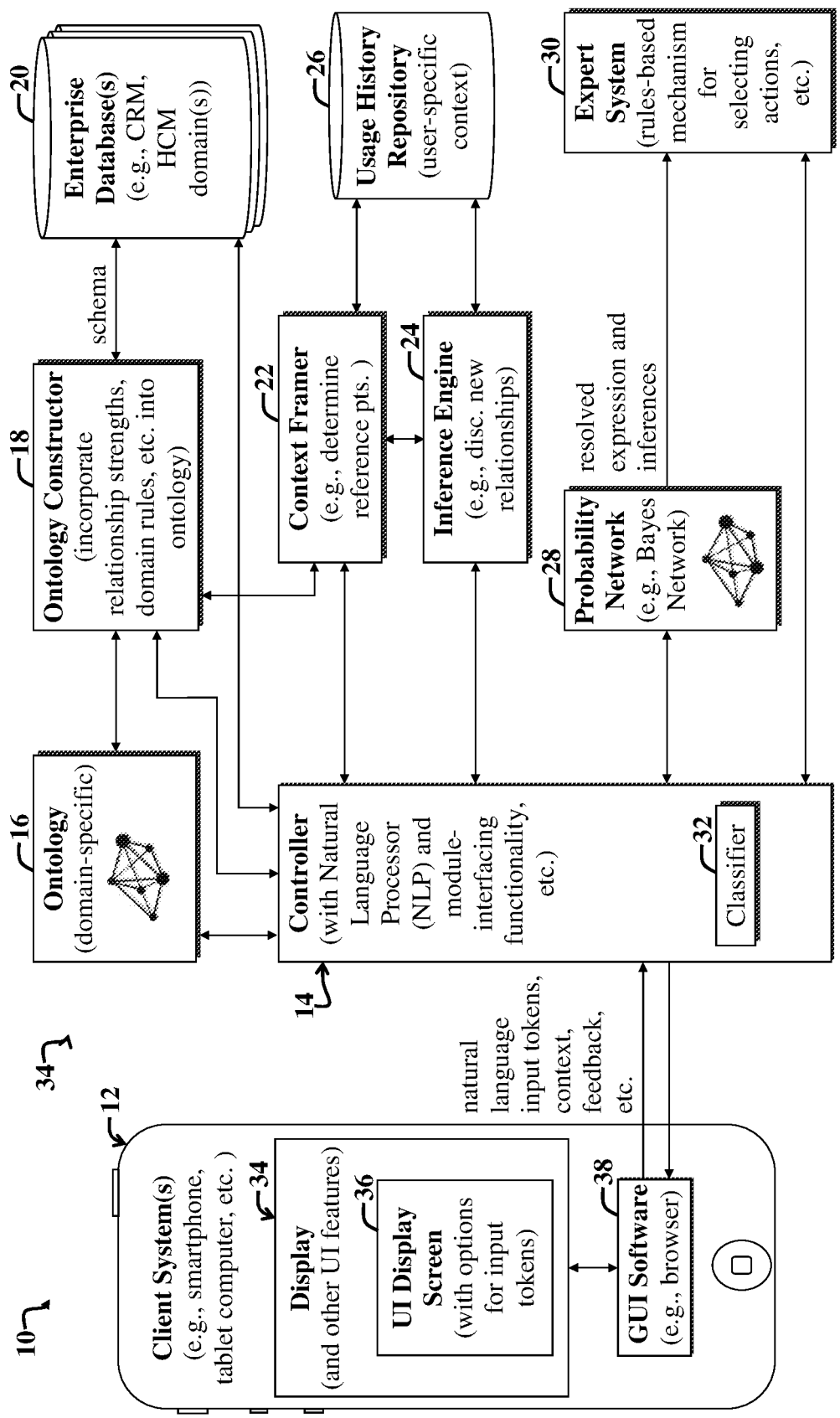
FIG. 1 is a block diagram illustrating a first example system and accompanying enterprise computing environment configured to enable machine interpretation of natural language, including resolution of implicit references therein, using a schema-based ontology, probability network, inference engine, and gathered context information.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as user interface software modules or components.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Such tasks may represent or be implemented via one or more software actions. A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on. The terms "software action" and "action" are employed interchangeably herein.

Enterprise data may be any information pertaining to an organization or business, including information about customers, appointments, meetings, opportunities, customer interactions, projects, tasks, resources, orders, enterprise personnel and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality. The computing objects may represent business transactions.

For the purposes of the present discussion, a business transaction may be any instance of or occurrence of one or more events, units of work, or processing steps and/or associated data related to an activity or process, e.g., business activity, and which may be grouped based on the activity or process. Similarly, transaction data may be any data characterizing or associated with an object, e.g., a business object, used as part of the transaction.

Note that the term "transaction" as used herein may have a different meaning than the conventional notion of a database transaction. Conventionally, a database transaction may be any change in a database associated with a unit of work, whereas, as the term "transaction" is used herein, a transaction may include data and functionality associated with a business object, and need not refer specifically to the operation of committing the business object for storage in a database.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices/

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, routers, the Internet, and so on, have been omitted from the figures. However, those skilled in the art with access to the present teachings will know which components to implement and how to implement them to meet the needs of a given implementation.

FIG. 1 is a block diagram illustrating a first example system 10 and accompanying enterprise computing environment configured to enable machine interpretation of natural language input (or other potentially vague input), including resolution of implicit references therein, using a schema-based ontology 16, probability network 28, inference engine 24, and gathered context information, including information maintained via a usage history repository 26 and/or obtained from a local computing device.

The example system 10 includes a client system 12, e.g., a mobile computing device, desktop computer, or other system configured to enable communications, e.g., via a network (such as the Internet), with server-side modules 34 of the system 10. Note that one or more of the server-side modules 34 may be implemented on the client system 12, without departing from the scope of the present teachings.

In general, with reference to FIG. 1, note that groupings of (and connections between) various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the various server-side modules 34 may be implemented via one or more servers and/or server clusters or on the same computer, e.g., on the client system 12, i.e., client-side.

The client system 12 communicates with an example server-side controller 14, which includes code for implementing Natural Language Processing (NLP) and module-interfacing functionality. The NLP functionality includes parsing of and classification of natural language input tokens (as implemented via a classifier 32), e.g., words or phrases of a spoken or typewritten input to the system 10. The spoken or typewritten input, e.g., natural language input, is provided via the client system 12 and accompanying Graphical User Interface (GUI) software 38, display 34, and UI display screen 36 features.

For the purposes of the present discussion, a token may be any element or component (or group thereof) of an input. For example, when referring to natural language, the token may be a word, phrase, or other grouping of the input.

A user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The server-side controller 14 communicates with the client-side GUI software 38, receiving natural language input therefrom and providing responses based on machine interpretation of the natural language input thereto.

For the purposes of the present discussion, natural language may be any speech or representation of speech, i.e., spoken or written language. Similarly, natural language input may be any instruction, request, command, and/or other information provided via spoken, written, or otherwise entered human language to a computer. Examples of language input usable with certain embodiments discussed herein include voice commands, text messages (e.g., Short Message Service (SMS) text messages), emails containing text, direct text entry, and so on. The terms "natural language input" and "language input" may be employed interchangeably herein. However, the term "language" or "language input" (as opposed to "natural language" or "natural language input") may be a broader term that includes any input that includes tokens that may refer to entities, where the input may include gestures or electronic representations thereof and other software-generated messages (e.g., commands generated based on user interaction with UI display screen features, e.g., selection of menu items, buttons, or other UI controls, etc.). In this sense, the term "language" may refer to any mechanism for conveying information or estimates of (or implications used to convey) information.

A machine interpretation of natural language input may be any computer-generated estimate of user intent associated with a portion of natural language. User intent of a portion of natural language, such as an entered query, is said to be estimated if a meaning is associated with or attributed to the portion of natural language.

A portion of natural language may include a word, phrase, or other subset of a given natural language input. A word or collection of words occurring in natural language input that names or otherwise identifies an entity (e.g., a company, opportunity, business account, city, etc.) are called natural language input tokens herein. In general, a token of input refers to a portion of a given input or set of inputs, whether or not the input or set of inputs represent natural language input.

Recall that various embodiments discussed herein are not necessarily limited to the processing, interpretation, and use of natural language input. For example, certain embodiments may be configured to resolve potentially ambiguous input messages generated by a software system, where the input messages do not necessarily represent natural language.

The server-side controller 14 communicates with and facilitates interfacing communications between other server-side modules 34, including an ontology constructor 18 and associated ontology 16, context framer 22, inference engine 24, probability network (e.g., a Bayes network) 28, expert system 30, and enterprise database 20 (e.g., CRM, HCM, and/or other relational database). The controller 14 may communicate with a usage history repository 16 via the context framer 22 and/or inference engine 24, as discussed more fully below.

The ontology constructor 18 includes computer code for constructing the ontology 16 using a database schema of the enterprise database 20. The general structure of the ontology 16 exhibits relationships derived from a database schema characterizing the enterprise database 20, which operates as part of a particular computing domain. Accordingly, the ontology 16 is said to be domain-specific.

For the purposes of the present discussion, an ontology may be any arrangement of or organization of data and any associated connections characterizing one or more semantic relationships between portions of the data (e.g., data objects). The arranged data may be arranged in portions called data entities or nodes, which may be associated with or otherwise represent underlying objects.

Ontologies, which often represent structured machine-readable data models, are often illustrated graphically via network diagrams that illustrate arrangement of the nodes and any semantic relationships therebetween. The nodes or data entities may represent computing objects, concepts, words, and so on. For example, a node may refer to a particular noun (e.g., person, opportunity, company, etc.), and edges (i.e., connections between nodes) may represent relationships (e.g., verbs) between connected nodes, e.g., "is located at," "is owner of," "has customer," and so on. The terms "ontology," "knowledge graph," and "semantic network" may be employed interchangeably herein.

In general, the ontologies discussed herein describe a set of entities in combination with information indicating how entities are grouped, related, categorized, subdivided, and/or otherwise arranged, hierarchically or otherwise, in accordance with similarities and differences between the entities and characteristics of the entities. The entities may be words and/or phrases associated with natural language, where relationships between the words and/or phrases are based on the meanings of the words and phrases; the context in which the words or phrases are used; and any database schema and rules associated with the natural language applicable to a given implementation of an embodiment. The implementation may be domain-specific, e.g., adapted for a particular context, topic, and/or computing environment, etc.

The domain associated with the particular context may represent, for example, a CRM domain in cloud-based enterprise networked computing environments. In general, a domain-specific ontology describes concepts relevant to a particular topic or area of interest, where the topic or area of interest identifies, represents, or otherwise characterizes the domain.

A database schema may be any description of a database structure. A database schema of a relational database or database management system may characterize the organization of data in a database, e.g., the arrangement of tables, dimensions, fields, and interconnections therebetween. A database schema may be depicted graphically and/or via a set of database integrity constraints. In general, depending upon the context in which the term is used, a "database schema" may refer to the structure of data in a database, a graph depicting the structure, and/or the semantics or code defining the structure itself.

In the present example embodiment, the ontology constructor 18 includes computer code for further augmenting the general structure of the ontology 16, which has been mapped from the schema of the enterprise database 20, as discussed more fully below. The ontology 16 is augmented with relationship strength values (also called weights or strengths) characterizing relationships between nodes of the ontology 16. Strengths of the relationships may be adjusted based on context information (e.g., by adjusting weights that define the relationship strengths). Note that nodes of the ontology 16 may correspond to or represent objects of the enterprise database 20.

For the purposes of the present discussion, a relationship strength or weight between two nodes of the ontology 16 may be any metric or associated value characterizing or estimating how closely the two nodes are related, e.g., semantically related or otherwise relevant to each other. For example, a first person may know a second person, who in turn may know a third person. The relationship between the first person and the third person may exhibit a lower relationship strength or weight as compared to the relationship between the first person and the second person. Note that entities, e.g., persons, companies, opportunities, projects, and so on, may be represented via nodes of an ontology and corresponding objects of a database.

In the present example embodiment, semantic distances are inversely related to relevancy (and weight), such that the smaller a relationship weight between two nodes, the stronger the relationship is, i.e., the more relevant a first node is relative to a second node associated therewith or connected thereto. Graphically, the weights may be indicative of (or inversely indicative of) a distance or hop count between a first node and a second node, wherein the hop count indicates a number of intervening nodes between the first node and the second node. Each hop may have its own weight. Each weight may be further scaled by an adjustable coefficient or function, which may be selectively adjusted by the ontology constructor 18 as context information changes. In general, a relevancy weight may represent or reflect a type of "semantic distance," such that if two entities are closer together in "semantic space," they have less distance between them and therefore have a higher relevance to one another—and the relationship will have a greater "weight."

The ontology constructor 18 may calculate a coefficient or function for a particular edge and/or path between nodes in the ontology 16 based on context information. For the purposes of the present discussion, context information may be any metadata, i.e., information about (e.g., related to, relevant to applicable to, or otherwise characterizing) data and/or associated functions, relationships, etc. The data characterized by the metadata (i.e., context information) may be applicable to a given entity, e.g., person, company, project, and/or associated computing object, and applicable to a given task, e.g., the task of interpreting, translating, or performing other processing associated with natural language input. The terms "context information," "contextual information," and "context" are employed interchangeably herein.

In the present specific example embodiment, the context information associated with a given word of natural language input includes all available information associated with the word other than the definition of the word itself. Accordingly, context information may include any information pertaining to natural language input, including, but not limited to user data, such as user location information, calendar entries, appointments, business cycle information, and so on. Context information for a given token may also include other input tokens (e.g., occurring in a given natural language input) that are provided in the natural language input.

The context framer 22 includes computer code for detecting reference points in the ontology 16 based on tokens or words occurring in natural language input received from the client system 12. For example, a user (or object associated with and including information characterizing the user) that provides natural language input via the client system 10 may represent a starting reference point or node in the ontology 16, which is then used to calculate relevancy of particular references occurring in the natural language input, as discussed more fully below.

The relevancy may represent a likelihood or probability that a given input token refers to a particular entity identified in the ontology 16 and derived from the schema of the enterprise database 20. The probability or likelihood may be calculated via the probability network 28, e.g., a Bayes network, which may interface with (i.e., communicate with) the ontology 16 via the controller 14.

The context framer 22 may further include computer code for updating a usage history repository 26 and extracting portions of data in the user history repository 26 that may represent context information usable by the ontology constructor 18 to adjust the ontology 16, and to thereby adjust probability calculations made by the probability network 28 and used by the controller 14. The probability calculations may be used by the controller 14 and/or expert system 30 to further resolve potentially ambiguous references associated with tokens of the natural language input, and to thereby facilitate machine interpretation of the natural language input. The incorporation of historical usage data can be used to create an adaptive system than learns based on user behavior.

For the purposes of the present discussion, a probability network may be any collection of one or more computing resources of a computing network, where the collection is configured to make or facilitate making one or more predictions or likelihood estimates that a given input represents a match for a candidate interpretation of the input.

The context framer 22 may also collect context information that describes inferred meanings (i.e., inferences) of natural language input tokens. Inferred meanings are determined or estimated via the inference engine 24, which may also reference (or otherwise access or communicate with) the usage history repository 26.

In general, an inference engine, such the inference engine 24, may discover, i.e., infer, new relationships between nodes (e.g., as discussed more fully below with reference to FIG. 6). The inferences may effectively alter distances (and associated total path weight or relationship strength between beginning and ending nodes of the path) between two nodes of the ontology 16. For example, if person A is a resource for opportunity X, and person B is also a resource for opportunity X, an inference engine may infer that person A and person B are colleagues, thereby shortening the path from an indirect one (through the opportunity node) to a direct inferred relationship.

Note that the usage history repository 26 is shown communicating with the context framer 22 and inference engine 24, but not directly with the controller 14. In this case, the usage history repository 26 may be populated with user history data (e.g., login history, settings history, software navigation history, browsing history, and so on) via the context framer 22 and inference engine 24, which may in turn obtain context from other modules of the system 10 via the controller 14.

However, recall that the particular arrangements and connections shown between the modules of the system 10 may vary, without departing from the scope of the present teachings. For example, the usage history repository 26 may communicate directly with the controller 14, i.e., without the intervening context framer 22 and/or inference engine 24. In general, the ontology constructor 18 may obtain context information from various modules of the system 10, including the enterprise database 20, context framer 22, the client system 12, the ontology 16, and so on.

Note that context information usable by the ontology constructor 18 is not limited to context information derived from user software usage history documented in the usage history repository 26. For example, the controller 14 may retrieve user location information, i.e., the location of the client system 12 by communicating with a Global Positioning System (GPS) receiver thereof. The GPS information may then be passed to the context framer 22 and usage history repository 26 for further use by the ontology constructor 18 to facilitate calculating weights and/or weight coefficients to apply to different node edges along a particular path (e.g., between nodes) in the ontology 16.

Note that context information need not be user specific and may further include context information derived from data maintained in the enterprise database 20 that may or may not be user specific. Context information is said to be particularly associated with a user (i.e., to be user specific) if the context information is associated with a device or software accessible to the user and/or data particularly identifying or characterizing the particular user (e.g., user name, address, etc.).

For example, a mobile phone user may be employing a mobile device (e.g., smartphone) with a GPS receiver. The mobile device is said to be associated with the user, as is the GPS location information provided by the GPS receiver thereof. Similarly, a user employing calendar software may enter appointments, and appoint information stored via the calendar software is associated with the user.

In general, context information associated with a user may pertain directly to the user or to one or more tasks, opportunities, or other computing objects (e.g., business objects) that are associated with or otherwise employed by a user or used by software employed by the user.

Note that the ontology constructor 18 and context framer 22 may also derive context information from the enterprise database 20. The context information may include, for example, relationships between database objects that correspond to nodes in the ontology 16, which in turn correspond to tokens or words natural language input received by the system 10 via the client system 12. Such context information may be used by the inference engine 24 (wherein the inference engine 24 references, analyzes, uses, or otherwise communicates with the ontology 16 via the controller 14) to develop additional context describing one or more inferences, i.e., inferred relationships, between nodes of the ontology 16. Another example of context information that may be available from the enterprise database 20 includes data that specify user enterprise access permissions, e.g., software and data access and user privileges.

After the ontology 16 is constructed via the ontology constructor 18 with reference to (i.e., based on) the schema of the enterprise database 20, the ontology 16 can then be used to facilitate interpreting (including resolving ambiguous or potentially ambiguous references in) natural language input from the client system 12. Upon receipt of natural language input from the client-side GUI software 38, the controller 14 may initially tokenize, parse, and classify (e.g., via the classifier 32) the input words or tokens.

The context framer 22 may facilitate determining a starting node or reference node (e.g., a node representing the user who provided the natural language input) to select a portion of the ontology 16 for use in analyzing the classified natural language input with reference to available context.

The selected portion of the ontology 16 may be adjusted by the ontology constructor 18 based on gathered context information, e.g., by adjusting node or edge weights and/or coefficients. After application of context information and associated adjustments to the ontology 16, the relationship weights and coefficients associated with different candidate paths from the starting node to candidate nodes (i.e., candidate entities or business objects that may represent meanings of particular natural language words and/or phrases) are then processed using the probability network 28 to determine or estimate most likely or probable meanings for natural language input references or tokens.

The probability network 28 may include additional computer code for resolving or interpreting references included in entire sentences or passages of natural language input. The resolved expressions and inferences may be forwarded to the expert system 30, and optionally, to the client system 12 and associated GUI software 38.

The client-side GUI software 38 may include computer code for enabling user feedback, e.g., enabling users to correct the system 10 when a particular interpretation of natural language input is incorrect. The user corrections may then be fed back as context information usable by the ontology constructor 18 and/or other server-side modules 34. The user feedback information may be stored in the usage history repository 26. Note that when the system 10 adapts to such user corrections, this represents a type of active learning that may augment passive learning based on other collected context information.

The expert system 30 may include computer code for selecting software actions, e.g., calling particular services and/or APIs of an accompanying computing environment so as to facilitate implementing software actions identified by the natural language input. The software actions may affect one or more software applications employed by the user of the client system 12, including web applications, databases, and/or client-side applications running on the client system 12.

For example, in one embodiment, natural language input to the controller 14 is used to populate data and/or parameters associated with particular business objects maintained via the enterprise database 20. In this case, the expert system 30 may trigger a database write, retrieval, or modification action (i.e., a commit, fetch, or modify). This action may be implemented in part via one or more APIs interfacing the expert system 30 with the enterprise database 20.

Note that in certain implementations of the system 10, the various server-side modules 34 are customizable to represent user-specific modules. Alternatively, the modules 34 are implemented as a set of reusable code (e.g., web services, APIs, etc.) that can adjust configuration and outputs based on user-specific context information input to the system 10.

Hence, the present example embodiment represents an architecture that leverages context to resolve input ambiguities. This is accomplished in part by determining an initial reference point (i.e. the user in a UX environment) within the semantic network (i.e., ontology); then estimating or determining the type and strength of that relationship with other entities to determine which entities are currently relevant e.g., by using references provided implicitly, e.g. a GPS location from a mobile phone, a calendar entry from a 'cloud' calendar and/or explicit references in the incoming data, e.g., nouns in a natural language phrase such as 'Joe' in 'I met Joe for lunch.'

In general, one or more ontologies may be generated for use in enterprise-related implementations based on structured databases, where the semantic relationships are implicit to the database schema. Then, an a priori understanding of the domain is used to selectively weight the strengths of the relationships and to create new relationships through inferencing. Then, a Bayes network is used to make predictions based on this weighted semantic network (i.e., ontology) and the observations of the incoming data. In other words, the Bayes network may use the pre-existing weighted semantic network along with incoming observations and state information to resolve ambiguities.

Note that while the present example embodiment addresses resolving ambiguity in natural language input, embodiments are not limited thereto. Natural language input may represent just one type of possible input data that may be used to construct an ontology that is then used in combination with a Bayes network to resolve input ambiguity to determine or estimate what (e.g., which computing object(s) and/or software actions) are relevant.

Figure 2:
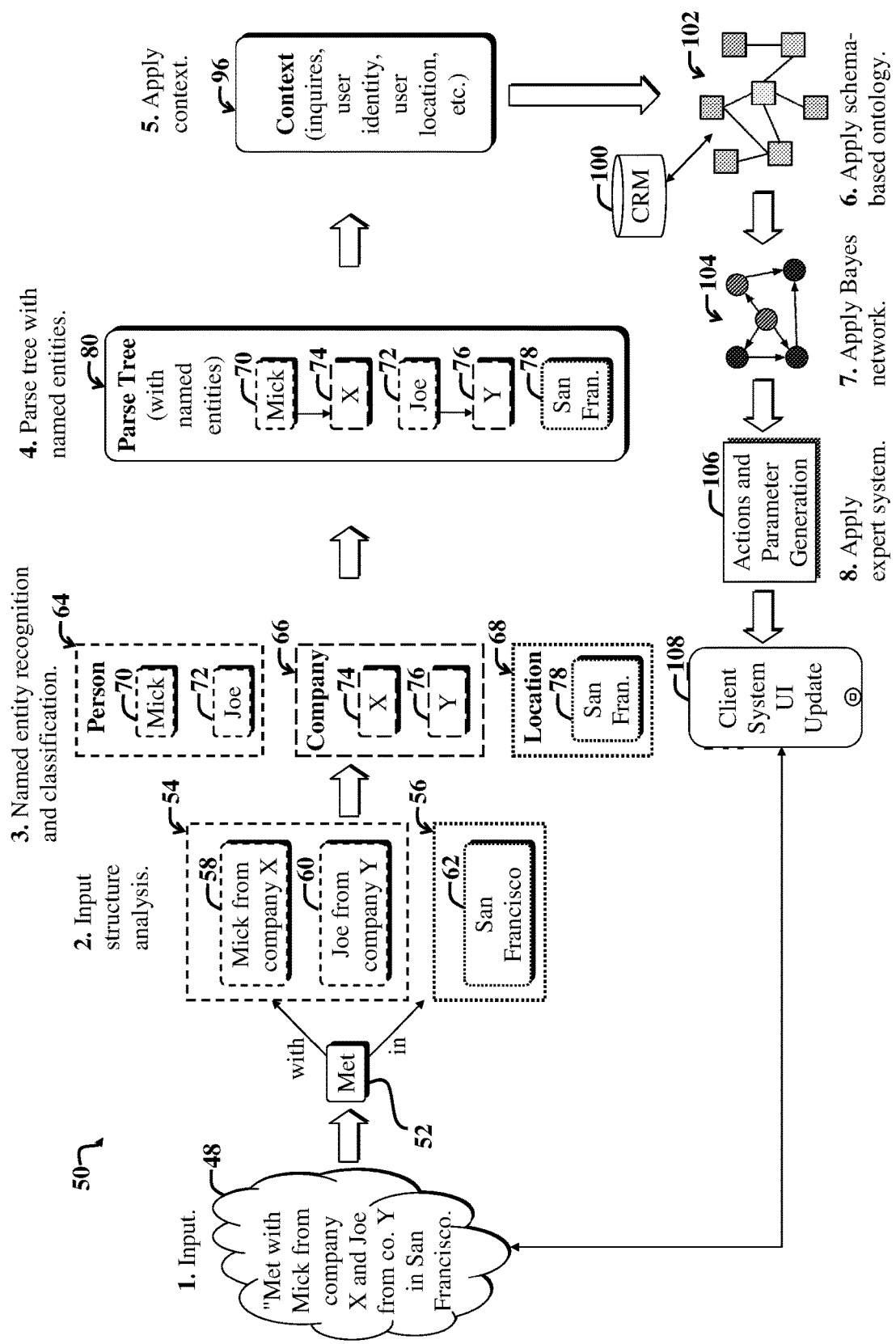
FIG. 2 illustrates a first example process flow that is implementable via the system of FIG. 1.

FIG. 2 illustrates a first example process flow 50 that is implementable via the system 10 of FIG. 1. With reference to FIGS. 1 and 2, initially, natural language input, e.g., input 48, is subjected to structure analysis. The structure analysis (shown as step 2 in FIG. 2) may be implemented via the controller 14 of FIG. 1.

As shown in FIG. 2, the example natural language input 48 is "Met with Mick from Company X and Joe from Company Y in San Francisco." The input structure analysis includes organizing tokens of the natural language input based on semantic relationships and between words or tokens. For example, the term "Met" 52 is associated with "San Francisco" 62 via the preposition "in." Similarly, Mick from Company X 58 and Joe from Company Y 60 are associated with the verb "Met" 52 via the preposition "with." The portions 58-62 of the natural language input are further grouped into a person group 54 and a location group 56.

Subsequently, after the input structural analysis (represented via blocks 52-62), additional classification and Named Entity Recognition (NER) is applied as represented by example blocks 64-78. Note that NER software used (e.g., by the controller 14 of FIG. 1) to further process the natural language input 48 may be trainable. Classification is used to resolve which tokens (58-62) in in step 2 belong to various categories (64-68) in step 3. A parse tree 80 then resolves the relationships between the categories, as discussed more fully below.

Note that while a maximum entropy classifier may be used for classification in the NER and classification step (step 3), embodiments are not limited thereto. Other types of classifiers may be used, without departing from the scope of the present teachings.

Example results of name entity recognition include separation of Mick 70 and Joe 72 into a person category 64; separation of Company X 74 and Company Y 76 into a company category 66; and inclusion of San Francisco in a location category 56.

After named entity recognition and classification, the results thereof are parsed into a parse tree 80. The parse tree 80 encodes (and may be used to illustrate) initial explicit relationships found in the natural language input 48. For example, Mick 70 is related to Company X 74; Joe 72 is related to Company Y 76, and San Francisco 78 represents a location associated with "Met" 52.

The parse tree 80 (step 4) involves resolving relationships between classified entities (70-78). For example, in the phrase "Mick from Company X," the classifier is used to determine that Mick refers to a person and Company X refers to a company; then the parse tree 80 (where 'from Company X' is subordinate to 'Mick') determines that Company X 74 is associated with Mick 70.

Up to this point (at step 4), the process 50 discusses explicit context parsed from the input 48. Subsequently, step 5 involves applying implicit context, using the ontology 102 that is built and/or applied in step 6, to determine relationships that inform the Bayes network 104 of step 7. The implicit context 96 may include, for example, information about a user identity, location, user job role, project associated with the user, and so on. Certain information about the user may be retrieved from an object or transaction maintained for the user in the enterprise database 20.

Next, an ontology 102 that has been derived from a relational database 100 (e.g., a CRM database) may be further used to analyze the classified and context-augmented natural language input. When the schema-based ontology 102 is applied to further analyze the natural language input, different entities or input tokens are matched with representative nodes in the ontology 102. Inquires may be made to a database (e.g., the enterprise database 20 of FIG. 1) to retrieve additional information maintained in database objects associated with different terms or tokens in the natural language input 48. Relationships between the nodes can then be weighted and/or scaled in accordance with the context 96 and other inquiry results.

The output of the ontology step 102 may include a set of candidate paths through (and/or portions of) the ontology 102 that are associated with the natural language input 48, as determined after input structure analysis 52-62, named entity recognition and classification 64-68, parsing 80, and application of context 96.

Subsequently, the selected candidate paths and associated weights are used by the Bayes network 104 to estimate probabilities or likelihoods that given natural language input tokens refer to particular entities in the schema-based ontology 102. Determination of the most probable or likely associations results in resolution of potentially ambiguous input references.

The resulting resolved tokens, e.g., terms and/or words, are then used (e.g., by the expert system 30 of FIG. 1 at step 8 in FIG. 2) to select and/or implement one or more software actions 106 in response to and/or based on the determination of or estimation of the meaning(s) of the natural language input 48. A selected software action may involve, for example, adjustment of input parameters for given service used by software of a client system 108.

In summary, the process flow 50 illustrates an example of machine interpretation of natural language input 48, which involves analyzing the structure of the natural langue input; recognizing named entities therein; resolving ambiguous and implicit references (e.g., which Mick; which Joe; which enterprise opportunity is applicable to the natural language input 48, etc.); and then using the resolved references to select, run, and/or otherwise adjust software accessible to a user of a client system, e.g., the client system 12 of FIG. 1.

Note that those skilled in the art with access to the present teachings may readily implement various components needed to implement versions of embodiments discussed herein without undue experimentation. For example, those skilled in the art may readily modify currently available software to implement an embodiment in accordance with the needs of a given implementation. Examples of currently available software that may facilitate implementations of embodiments discussed herein include Apache OpenNLP and Stanford NLP (for implementing natural language processing), JavaBayes (e.g., to implement probability networks), Swoogle for use with a Bayes classifier (e.g., to implement classifiers), Apache Jena (to facilitate ontology construction), and so on.

Figure 3:
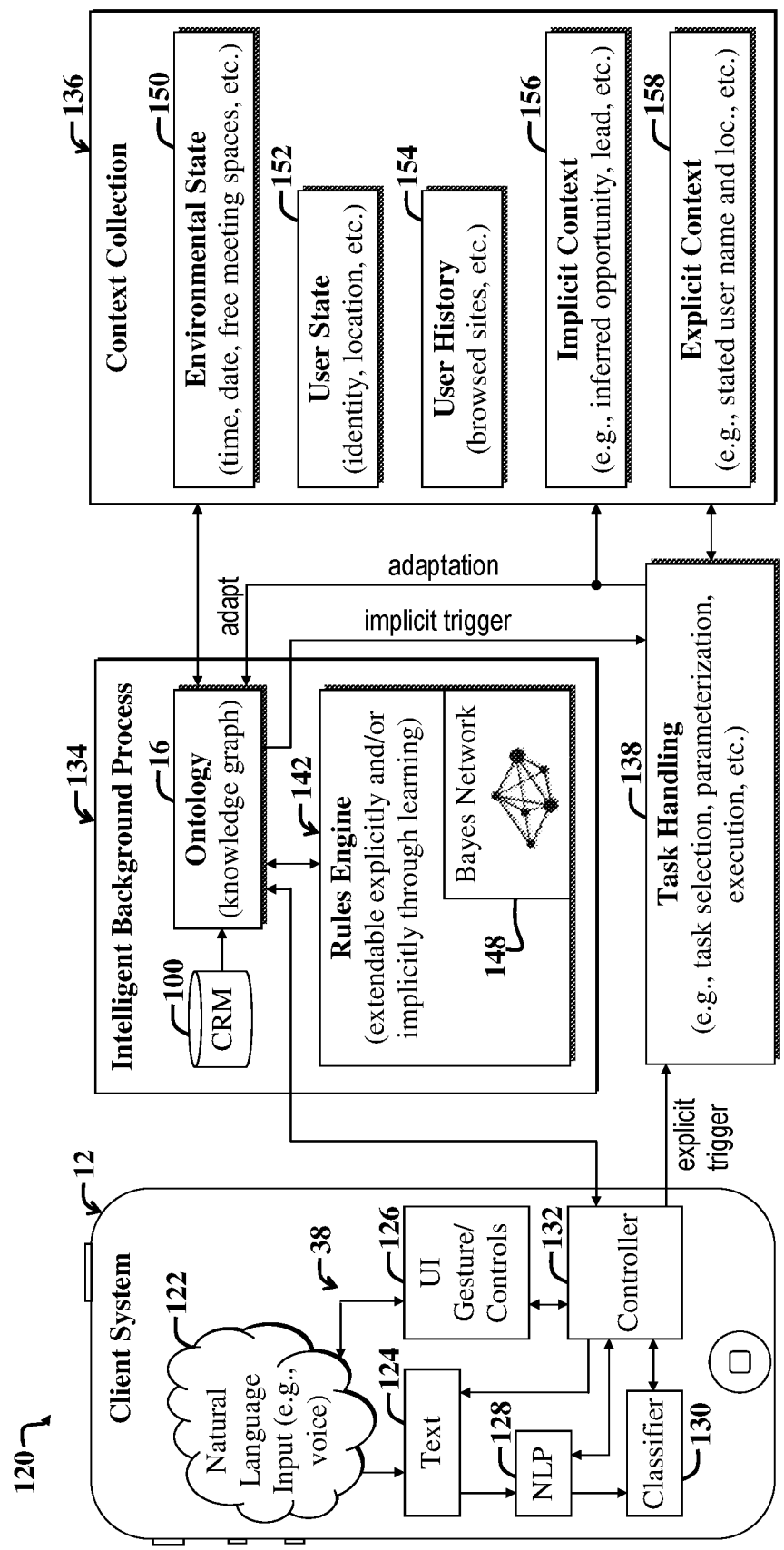
FIG. 3 illustrates a second example system configured to enable implicit resolution of implicit references occurring in input, e.g., natural language, in part by ontology relationship strength adjustments and additions and/or modifications to context information.

FIG. 3 illustrates a second example system 120 configured to enable implicit resolution of implicit references occurring in input, e.g., natural language, in part by ontology relationship strength adjustments and additions and/or modifications to context information.

The example system 12 includes client-side NLP functionality 128 and a classifier 130 in communication with a client-side controller 132. The client-side controller 132 further communicates with or receives input from UI gestures and other UI controls.

For the purposes of the present discussion, a UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The NLP functionality 128 receives text output from a speech-to-text converter 124, which initially converts spoken natural language 122 into text. The text is then processed by the NLP 128 and classified by the classifier 130. The results are accessible to the client-side controller 132.

The client-side controller 132 communicates with a server-side intelligent background process 134 and a task handling module 138. The intelligent background process 134 includes an ontology module 16 in communication with a CRM database 100 from which the database schema used to construct an ontology (via the ontology module 16) is derived.

The ontology module 16 includes computer code for providing functionality enabling construction of a schema-based ontology, and enabling adjustment of ontology edge weights in accordance with context derived from the database 100, context derived from the natural language input 122 itself, and collected context 136. Examples of context that may be accessible in the context collection 136 include environmental state 150 (e.g., time, date, available meeting spaces, etc.), user state 152 (e.g., identity information, location, etc.), user history 154 (e.g., recently browsed websites, frequency of access to a particular database object or transaction, etc.), other implicit context 156 (e.g., inferred opportunity, lead, etc. as may be determined via an inference engine), and other explicit context 158 (e.g., stated user name and address, stated opportunity or task, etc.).

The example ontology module 16 further includes computer code for interfacing with and using an expandable rules engine 142, which is configured to enable modification of rules based on explicit and/or implicit learning. Adjustments may be made, at least in part, based on feedback received from other modules, including user feedback provided via the client system 12.

The example rules engine 142 includes a Bayes network 148 (or other probability network or mechanism) for computing probabilities or likelihoods that a given input reference or phrase represents a particular entity or node in the ontology constructed by and/or maintained by the ontology module 16. The probability information output by the rules engine 142 may be provided to one or more processes or routines of the ontology module 16, which may then use the calculation(s) to issue an implicit trigger to the task handling module 138.

An example of a phrase that may result in an implicit trigger is "Running late." In this case, the ontology module 16 determines the user; accesses a corresponding node in the ontology; applies path weights along various paths of the ontology to candidate nodes that may be referred to by the input. The ontology module 16 then leverages the rules engine 142 and accompanying Bayes network 148 to estimate probabilities that the phrase "running late" refers to a particular ontology node, e.g., a particular opportunity, meeting with a particular person, and/or other nodes. Another approach can first map the phrase 'Running Late' to an action, such as sending text notifications to all meeting participants that the user will be late for a meeting. The participants can be resolved by knowing the meeting, its attendees, and the user. Using the user's calendar, the current date/time, and the user's location, the list of meeting attendees to be notified can be determined. If a user, 'Joe,' is listed, then the user's identity, meeting location, and even which projects are of highest priority to guess at which 'Joe' is the likely 'Joe' referred to. The user can be prompted to confirm this is indeed the right 'Joe'.

The most likely node that "running late" may refer to (e.g., for a meeting with Mick and Joe) is determined via the Bayes network 148 with reference to the ontology. Context information associated with Mick and Joe (e.g., the current locations of Mick and Joe) may also be leveraged during the analysis. The resulting implicit trigger forwarded to the task handling module 138 may trigger the task handling module 138 to initiate a task based on the machine interpretation that the user is running late for a meeting with Mick and Joe in San Francisco.

Examples of a software actions or tasks that may be selected and implemented via the task handling module 138 in response to the implicit trigger include generating and sending a text or email to Mick and Joe indicating that the user is running late; updating a calendar entry of the user, and so on. Such tasks may be implemented via the controller module 132 in response to signaling from the task handling module 138. Alternatively, certain tasks can be implemented via code running on the task handling module 138 and/or via other modules (e.g., web services, APIs, etc.) in communication with the task handling module 138.

Results of the implementation of a given task, e.g., parameters generated and user feedback received, may then be employed to adjust, i.e., adapt the ontology module 16 and the context collection 136 with any additional context. The additional context or changed context, including any user indications of system errors, may be passed from the task handling module 138 to the intelligent background process 134 and/or to the context collection 136. Hence, the intelligent background process 134 and context collection 136 can learn or change in accordance with new incoming information.

In cases where an explicit trigger (as opposed to an implicit trigger) occurs in the natural language input 122, the explicit trigger may be indicated via a signal from the client-side controller 132 to the task handling module 138. An example of input that may initiate an explicit trigger includes "Schedule a meeting." In this case, the term "meeting" may already be known to the task handling module 138 and may be sufficient to trigger the task handling module 138 to initiate an update (e.g., to a user's calendar software) or to issue a responsive question to the user of the client system 12. The system can also make an educated guess at the likely general topic for the meeting (e.g., a specific deal opportunity, etc.).

Hence, in summary, after natural language input is parsed into named entities (e.g., using an external service such as Endeca or OpenCalais), then relevancy is calculated by mapping those entities to nodes within an ontology (also called knowledge graph herein) and then using current context information 136 to determine a reference point from which to calculate paths through the topology of the ontology to those entities.

Current user interests, may also calculated by mapping named entities to entries in a data structure (e.g., as may be maintained via the user history 154 module of the context collection 136) that contain a set of existing interests specific to a given user. Note that the inclusion of each interest in the set may exhibit time decay, so that interest in that entity decreases over time unless continually revived by the user. Note that this set may contain entities that are not present in the knowledge graph or ontology constructed via the ontology module 16.

The particular entities that are included in the set may be determined by the user interface (e.g., via the UI gestures and/or controls 126). In certain implementations, all named entities are incorporated for analysis and parsed from the browsing activity of a user. The named entities may then be ranked by interest (e.g., in accordance with a given interest metric) based on frequency of occurrence. Alternatively, more explicit mechanisms could be used, such as via a specialized ranking system.

In addition, while one approach may focus on processing a set of named entities, another approach involves developing an interests model that may manifest as a graph representing its own ontology. The resulting interests ontology may then be dynamically combined with the domain level ontology of the ontology module 16.

Note that use of separate structures or models, e.g., a domain level ontology and an interests ontology or structure, may operate independently of each other in certain implementations. For example, a domain level knowledge graph common to all users may still provide context but not personalization. Alternatively, an "interest level" user-specific data structure may be generated solely by a user's activity and may provide personalized and highly interesting content, even though the content was generated while lacking domain knowledge. Also note that while the relevancy and interest measurements may be combined into a single unifying metric, in certain implementations, the user of a client system may be provided with one or more user options to decide how to combine such measurements and context.

In general, a facility to enhance the domain level knowledge graph (e.g., ontology) by adding new entities and relationships, as provided via various embodiments discussed herein, may yield significant benefits over current state-of-the-art systems.

Figure 4:
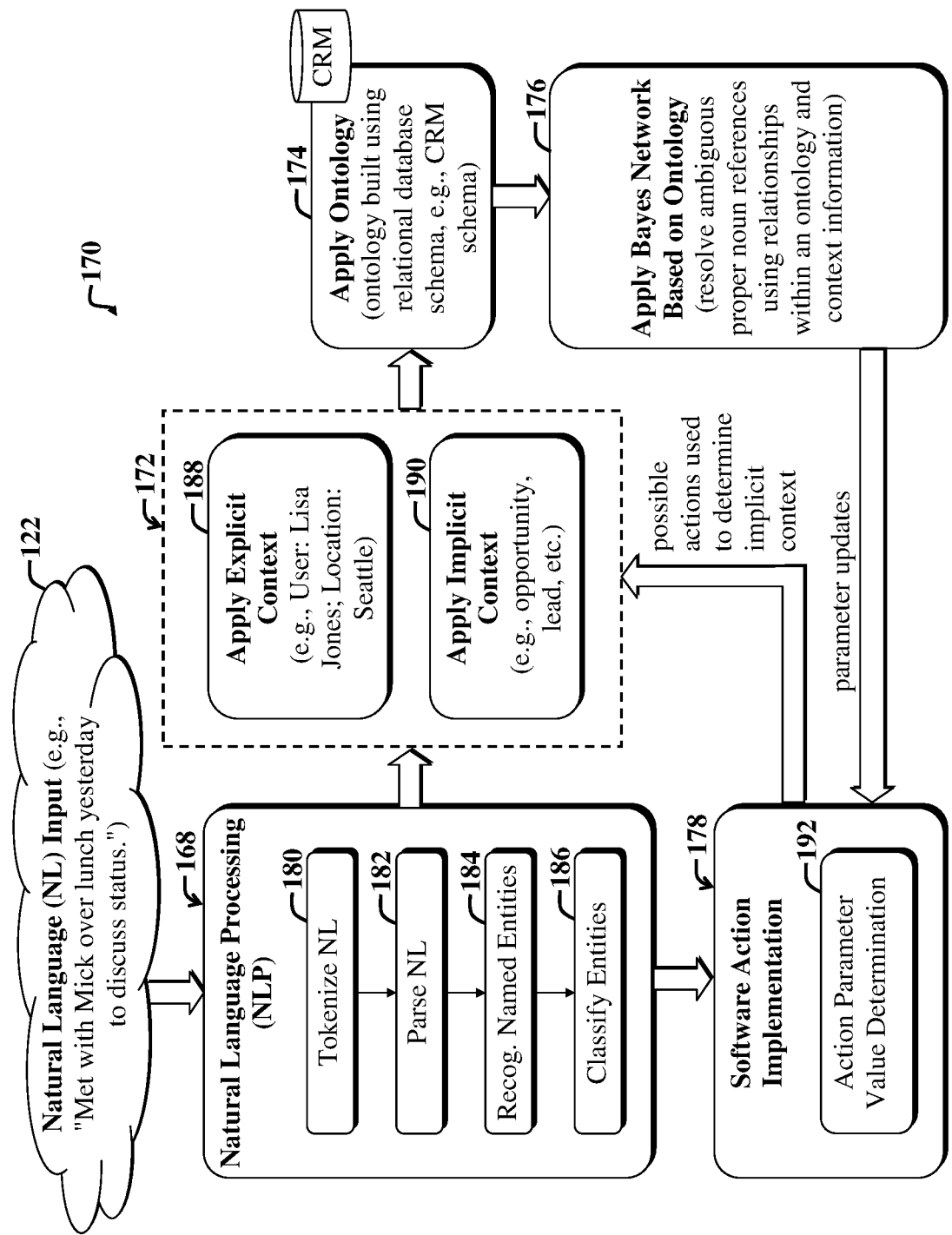
FIG. 4 illustrates a second example process flow that is implementable via the system of FIG. 3 and/or FIG. 1.

FIG. 4 illustrates a second example process flow 170 that is implementable via the system 120 of FIG. 3 and/or the system 10 FIG. 1. In the process flow 170, natural language input 122 is provided to an NLP step 168, which includes tokenization 180, parsing 182, named entity recognizing 184, and classification 186 sub-steps. The NLP steps 180-186 result in processed and classified representations of the natural language input 122. Note that the classification 186 sub step 186 may be considered as a separate step from the NLP step 168, without departing from the scope of the present teachings.

Note that NLP may involve building a hierarchical parse tree, identifying proper nouns, and so on. To implement the NLP step 168, a natural language processor module (e.g., as may be implemented using OpenNLP) may be trained offline before being used to process the natural language input 122. Similarly, a classifier module (e.g., Bayes classifier, maximum entropy classifier, etc.), as may be used by the classification sub-step 186, may be trained offline before use. In general, a classifier module may contain computer code for recognizing key words, phrase structure, and other parts of speech, i.e., natural language input. In a particular embodiment, the classifier referred to in this paragraph, which is used to classify tokens, is different from the Bayes Network described below, which is used to generate probabilities and resolve ambiguities. In general, different suitable approaches may be used.

The resulting processed input content is then available to a software action step 178 and a context application step 172. The software action step 178 may include action parameter value determination 192, which may involve determining and/or estimating parameters to be provided to software processes used to implement candidate software actions (e.g., using calls to one or more web services).

The software action step 178 may further include identifying possible actions, i.e., initial candidate actions. The candidate actions are then made available to the context application step 172.

The context application step 172 involves applying explicit context 188 and applying implicit context 190 to processed content output by the NLP step 168 and with reference to candidate software actions initially identified by the software action step 178. The explicit context application 188 may include associating input tokens occurring in or associated with the processed content from the NLP with a particular user, location data, and other explicit or readily available context.

The implicit context application 190 may include associating input tokens with implicit context, which may include information about inferred references, indications of candidate software actions, and so on.

Subsequently, an ontology application step 174 involves applying a schema-derived ontology based on the output of the NLP step 168 after application of context during the context applying step 172. The context may be used to weight or apply coefficients to different paths between nodes of the ontology. One or more portions of the path-weighted ontology are then usable in a Bayes network applying step 176 to calculate probability values for each path on the portions of the path weighted ontology to determine or estimate the most likely associations between input tokens and entities occurring in the ontology. The likely associations and associated language interpretations are then usable to generate parameter updates, i.e., to update software action parameters used in the software action step 178.

The software action step 178 may further include initiating or implementing specific software actions (e.g., by calling specific web services), where the actions have been fed updated parameters in accordance with output from the Bayes network applying step 176.

Figure 5:
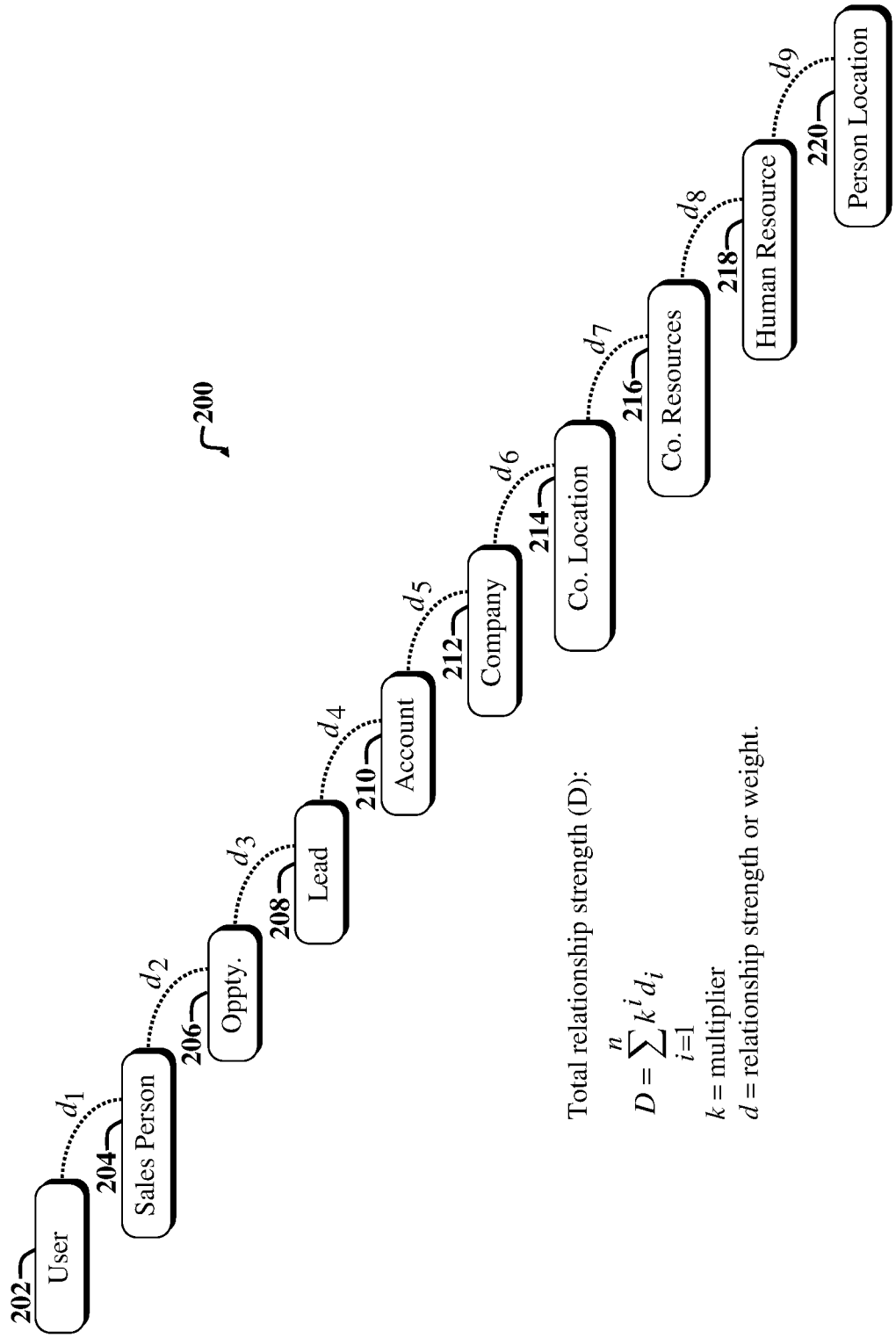
FIG. 5 illustrates an example path in a first example ontology, where nodes along the path exhibit relationship strengths that are usable by a probability network (e.g., Bayes network) to facilitate determining a probability or likelihood that a particular reference (e.g., input token or word) refers to a particular entity or node in the ontology.

FIG. 5 illustrates an example path 200 in a first example ontology, where nodes 202-220 along the path 200 exhibit relationship strengths (d1 . . . d9) that are usable by a probability network (e.g., Bayes network) to facilitate determining a probability or likelihood that a particular reference (e.g., input token or word) refers to a particular entity or node in the ontology.

In the example path, i.e., ontology portion 200, a user 202 sales person is associated with a sales person object or node (also called entity or object) 204, which is associated with an opportunity node 206, which is associated with a lead node 208, which is associated with an account node 210, which is associated with a particular company node 212, which is associated with a company location node 214, which is associated with a company resources node 216, which is associated with a human resource node 218, which is associated with a person or resource location node 220. The human resource node 218 may represent, for example, a database object of a person who is associated with the user 202 via the associations indicated via the path 200.

Each association is weighted (e.g., via weights d1 . . . d9). The weights may be uniform and represent distance or hop count, and/or the nodes may be scaled by one or more multipliers (k). The multipliers may be constants and/or variables that are adjusted in accordance with an algorithm leveraging context information. In a particular embodiment the multiplier is a term that takes into account the number of hops away an entity is from the current entity, the idea being that the more hops needed to reach a node, the disproportionately less relevant the node becomes relative to the starting node. Note that the individual weights for any given connection remain the same—it's just that they are possibly devalued depending on where they occur in the chain.

In the present example, the total relationship strength characterizing the relationship between the user 202 and the location 220 of an associated human resource is calculated as a sum of the individual weights (also called distance weights d1-d9) scaled by individual multipliers (k1 . . . k9) in accordance with the following equation:

$$D = \sum_{i=1}^{n} k^i d_i, \quad (1)$$

where i is an integer ranging from 1 to n, where n is 9 in the present example. Note that D will inversely vary with a relevancy calculation indicating a relevancy of one node to another node. The relevancy may then be used during probability calculations, e.g., as may be implemented via a Bayes network.

The ontology portion 200 and associated weight and total weight may then be used by a Bayes network or other probability calculation or estimation algorithm to estimate a probability that the user 202 is associated with the person location 220 and is referring to the person location 220 in provided natural language input. Note that the probability estimate may be adjusted in accordance with other candidate paths and associated weights through a larger ontology associated with the user 202 and/or natural language input provided thereby.

Note that, in general, nodes of an ontology or portion thereof, e.g., the nodes 202-220 may represent key concepts (e.g., nouns) such as person, opportunity, company, and so on. Edges (also called connections) between nodes represent the relationships (e.g., as represented by verbs) between entities, such as "is located at," is owner of," or "has customer."

Furthermore, the set of nodes and edges of an entire ontology may represent the entire universe of knowledge in a domain, such that if a concept or relationship is not found in the ontology, the concept or relationship is considered nonexistent for the purposes of machine interpretation of natural language references as discussed herein.

A path through an ontology may traverse multiple connections between nodes, where the path represents the relationship between concepts. Relationships can be direct, indirect (through intervening nodes), or non-existent.

Note that an ontology need not supplant an entire database (e.g., CRM database), but rather, the ontology may contain only those constructs that have significant semantic meaning and therefore only a subset of the information in the CRM database. Accordingly, an ontology may be timely updated when changes occur in an associated database from which the schema of the ontology is based. In addition, an ontology may contain information that is not found in the original database.

Furthermore, the database may remain the primary repository for the vast majority of information, and can be leveraged by client systems to retrieve detailed information about entities within the ontology. For example, while an ontology may have an entity representing the person "Lisa Jones," as well as the customers and opportunities associated with Lisa Jones, ancillary information, such as email addresses or phone numbers, which may not be currently stored in the ontology, may instead be retrieved from the associated database.

In the present example embodiment, relationship strength (e.g., "d") between two nodes is inversely related to the distance between those nodes. This distance measure is affected by factors, including number of legs (or hops) in the path between the two nodes, and relative strength of the relationship for each leg or hop.

The number of legs or hops along a given path is denoted (n), and the distance or weight between two adjacent nodes is denoted (d). k may represent a multiplier that selectively magnifies the distance as the path gets longer. This latter term may encode the notion that as a relationship becomes more indirect, the strength of that relationship is exponentially decreased.

Note that connections can be assigned different intrinsic distance values. For example, an "is part of" relationship may be assigned a distance value of 0.5, whereas a "has part" relationship may be assigned a value of 2, thereby expressing the notion that the former relationship tends to be stronger than the latter.

Furthermore, note that for any two nodes in an ontology or portion thereof, there may be no, one, or more than one path connecting them. Each path is assigned a relevancy value based on the number of legs in the path and based on the strength of the intervening connections (also called edges).

Note that in the present example embodiment, context information may be attributed to or associated with particular beginning reference point or node in an ontology from which relevance is calculated. For example, consider a case where current context is represented by user identity, and where the objective is to find the relevancy of Company X. The relevancy of Company X to a given user will depend on the strength of the relationships (which may include direct and indirect or inferred relationships) between that user and Company X.

Hence, the relevancy will vary depending on the user's identity. If, for example, Company X is a customer of User A while the only connection with User B is that both Company X and User B reside in the same country, then Company X may be deemed more relevant to User A. Note that context information can be expanded to include current location and time. Such context may provide additional reference points within the ontology to determine relevancy.

Note that the example ontology 200 merely illustrates an example path through an ontology. Another alternative example ontology could show a network of connected nodes with one or more paths highlighted through the network. In addition, the user node 202 and the sales person node 204 could be combined as one node, as the user may be synonymous with his/her role. In such an example ontology, rather than illustrating a single non-branching path, the ontology may show multiple connections to one or more opportunities and one or more leads, all within a single step (or hop) from the sales person. Every one of those opportunities or leads may in turn be a single step away from a particular account, and each account may be associated with a company, and particular opportunities and leads may share particular accounts. Each company has resources, and each resource may have a location, all of which may represent entities (depicted as nodes) of the example ontology.

In such an alternative example ontology, use of the weighting formula (equation (1)) may be illustrated by highlighting a path through the ontology from the user sales person to another node, such as a company node. To illustrate how implicit entities can be inferred using the ontology, a direct relationship between the user and his/her current location node can be highlighted, and the relationship between that location and all companies, resources, etc., that are also at that location and share a direct or indirect connection to the user.

Figure 6:
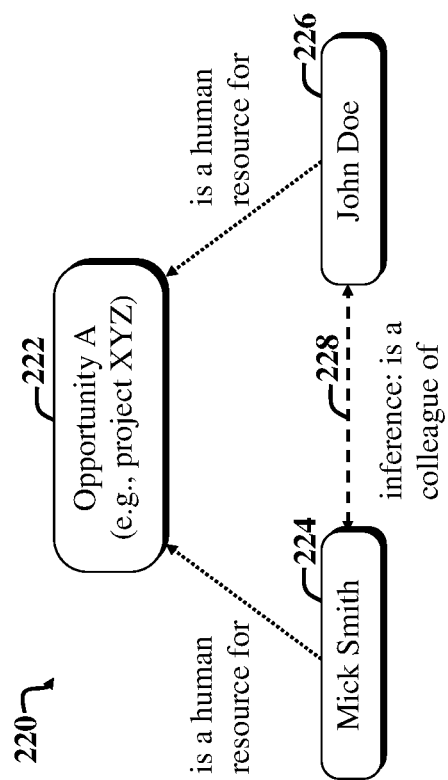
FIG. 6 is illustrates a portion of a second example ontology, where an inference engine has inferred an implicit relationship between two nodes of the ontology based on explicit relationships of the two nodes with a common node.

FIG. 6 is illustrates a portion 220 of a second example ontology, where an inference engine has inferred an implicit relationship 228 between two nodes 224, 226 of the ontology based on explicit relationships of the two nodes with a common node.

In the present example, the ontology portion 220 includes an opportunity node 222, which is associated with a Mick Smith node 224. The association is that Mick Smith 224 represents a human resource for Opportunity A 222. Similarly, John Doe, as represented by a John Doe node 226 is a human resource for Opportunity A 222. Based on this information, the inference engine then infers that Mick Smith 224 is a colleague of John Doe 226, thereby establishing the inferred relationship edge 228 or connection between Mick Smith 224 and John Doe 226.

Inferences, such as the inference 228, may be used to augment or otherwise an ontology, such as by adding new edges, adjusting strengths of other edges in a portion of an ontology, and so on. The inference 228 can also be used as additional context to facilitate software action selection and/or parameterization; to adjusted probability calculations of a Bayes network; to otherwise inform machine interpretation of potentially ambiguous in put references or phrases, and so on.

Figure 7:
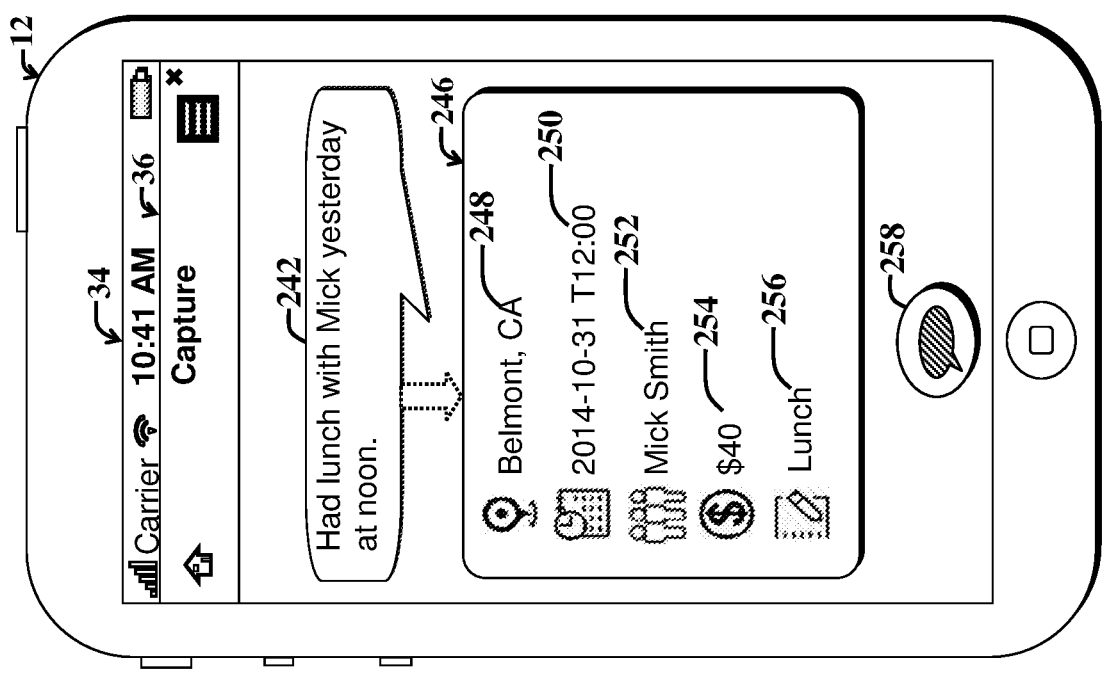
FIG. 7 illustrates a first example User Interface (UI) display screen appearing on a client system and used to input natural language, where implicit and ambiguous references in the natural language are resolved, and wherein information mapped to these resolved references can be used to populate fields and/or parameters of one or more enterprise business objects.

FIG. 7 illustrates a first example User Interface (UI) display screen 36 appearing on a display 34 of a client system 12 and used to input natural language 242. Explicit and any implicit references in the natural language are resolved, and information associated with the natural language input 242 can be used to provide output content 246. Providing output content 246 may involve populating fields and/or parameters 248-256 of one or more enterprise business objects, as may be maintained via an underlying enterprise database.

Note that content of the UI display screen 36 may be separated into two or more screens. For example, a first screen may show captured and translated natural language input 242 on a first screen, which then triggers display of a subsequent screen showing the database fields 248-256 that have been populated in response to the user input 242.

Note that the example fields 248-256 are merely illustrative and may vary depending upon the implementation. For example, in certain implementations, the fields may further include an indication of an opportunity or business transaction related to the input 242, and/or other implicitly derived information (e.g., derived via an inference engine).

Note that various embodiments discussed herein may be adjusted or altered to facilitate implementing various tasks. For example, one implementation may address the need for salespersons to enter short memos while traveling, the memos of which are later used to populate database transaction or objects. Any ambiguities in the input may be resolved before populating the transactions or database objects.

Another implementation may be incorporated into a system or used with a system that involves analysis of simple natural language phrases so as to determine and suggest appropriate user actions and/or software actions.

In general, after setting up an implementation of an embodiment discussed wherein, the associated system may be immediately responsive to and aware of other information that may be useful to the user by referencing an ontology and/or associated database and schema. This other information may then be made available to the user.

Implementations of embodiments may leverage preexisting information about explicit and implicit references, the information of which may exist inherently in a database and/or associated schema. For example a CRM database schema can readily be mined for semantic relationships between entities in accordance with embodiments discussed herein.

Figure 8:
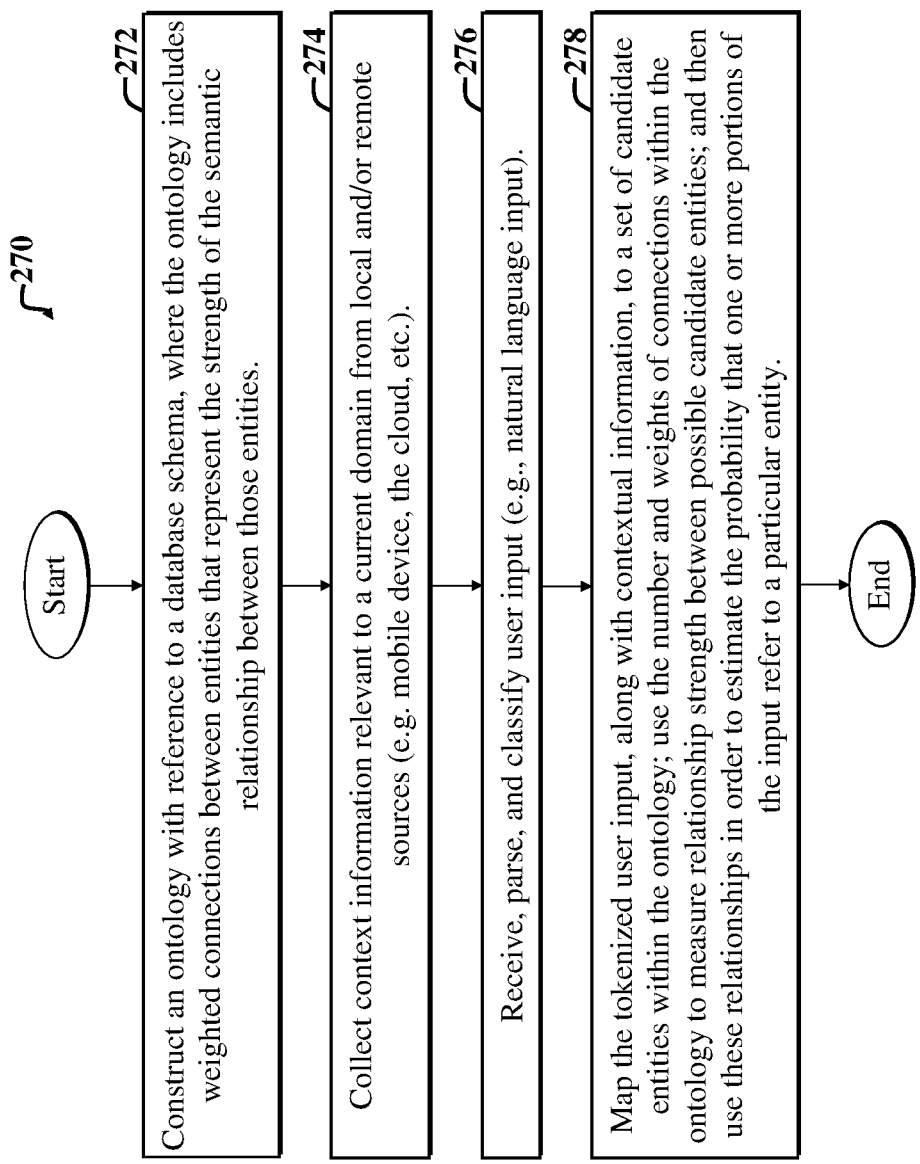
FIG. 8 is a flow diagram of a first example method suitable for use with the embodiments of FIGS. 1-7.

FIG. 8 is a flow diagram of a first example method 270 suitable for use with the embodiments of FIGS. 1-7. The first example method 270 facilitates machine interpretation of natural language input, e.g., resolution of potentially ambiguous references (words, phrases, etc.) in the natural language input.

The first example method 270 includes an initial ontology-construction step 272, which involves constructing and/or otherwise obtaining or enabling access to, an ontology that is based on a database schema, e.g., an enterprise CRM or HCM database schema. The ontology including one or more indications of relationship strength (e.g., using relationship weights, scaling coefficients, etc.) characterizing two or more words, i.e., entities or nodes, of the ontology. The one or more indications of relationship strength may manifest as weighted connections between entities, where each weighted connection is weighted in accordance with the strength of the semantic relationship between the entities.

Next, a context-collection step 274 includes collecting context information relevant to a current domain from local and/or remote sources (e.g. mobile device, the cloud, etc.). The current domain may refer to, for example, a domain that hosts software used to determine the machine interpretation. The domain may correspond to a CRM domain or other domain that includes the database used to derive the ontology in the initial ontology-construction step 272. Note that the same domain used to accommodate the database may also be the domain used to implement software actions and process natural language inputs, but embodiments are not limited thereto. For example, the database may represent a different domain than the domain used to process natural language, without departing from the scope of the present teachings.

Next, an input-receiving step 276 includes receiving user input (e.g., natural language input). The input-receiving step 276 may further include parsing and classifying user input into a set of tokens, also called entities herein.

A subsequent input-using step 278 includes mapping the tokenized user input, along with contextual information, to a set of candidate entities within the ontology; using the number and weights of connections within the ontology to measure relationship strength between possible candidate entities; and then using these relationships in order to estimate the probability that one or more portions of the input refer to a particular entity. Hence, a specific implementation of the input-using step 278 may involve employing the natural language input and the ontology to estimate a meaning of the natural language input. A meaning is said to be estimated when an association between an input token (e.g., word or phrase) and an entity (e.g., represented by a database object, ontology node, and/or other entity) is selected as a most likely or most relevant association referred to by the input token. In certain embodiments discussed herein, the meaning is estimated using the context information; the one or more indications of relationship strength; and an estimation of a probability that one or more portions of the natural language input refer to a particular entity.

A more specific example of employing the natural language input with reference to the ontology to estimate a meaning of the natural language input follows. Suppose, for example, that the natural language input is "Meet with Joe." The user (e.g., Jason) may know several persons named Joe. In accordance with the present example method, estimating which Joe that the natural language refers to involves referencing, inspecting, or otherwise accessing the ontology; determining which node of the ontology refers to the user Jason; then calculating relationship strengths between Jason and all of the people named Joe that Jason knows based on the relationship strengths between ontology paths between a Jason node and each Joe node in the ontology. The Joe node (i.e., ontology node representing Joe or otherwise representing a computing object associated with Joe) exhibiting the highest relationship strength (e.g., as may be based on path weights characterizing the path between the Jason node and each Joe node) may be selected as the proper Joe. Note that alternatively, or in addition, the determination as to which 'Joe' is the most likely Joe (referred to by the input) may account for (and/or be determined by) Jason's current location, thereby leveraging real-time contextual information.

The selected proper Joe represents or is otherwise incorporated into the estimate of the meaning of the natural language input.

Note that the method 270 may be modified, e.g., augmented or otherwise changed, without departing from the scope of the present teachings. For example, the method 270 may further specify that the one or more portions of the natural language input include one or more words, the one or more words represented by one or more nodes of the ontology. The example method 270 may further specify using a Bayes Network to estimate the probability.

The method 270 may further specify that the ontology includes a domain-specific ontology, e.g., an ontology associated with a particular computing domain corresponding to a domain that includes the database used to construct the schema-based ontology. The domain-specific ontology may be specific to the domain that hosts software used to determine the machine interpretation and/or specific to the domain that hosts a database that is characterized by the database schema.

The context information may include one or more rules characterizing the database schema. The database schema may include the schema of a CRM and/or HCM database.

The example method 270 may further include employing the interpreted or estimated meaning to generate a machine translation of the natural language input. A software action may then be selected and implemented based on the machine translation. The software may include, for example, a software action that generates a notification.

The example method 270 may further include using a Bayes network to compute probabilities that a token of the natural language input refers to a particular database entity, wherein the particular database entity is represented by a particular node of the ontology.

The context may be augmented based on the natural language input and one or more user corrections to the meaning. The ontology may characterize strengths characterizing one or more semantic relationships between a computing object associated with a user and one or more other entities of the domain.

The input-using step 278 may further include filtering the context information based on the one or more portions of the natural language input, resulting in filtered context; and using the filtered context and strengths as input to a predictive network, such as a Bayes network. The predictive network may be configured to a probability that the token of the natural language input refers to a particular entity of the domain.

Figure 9:
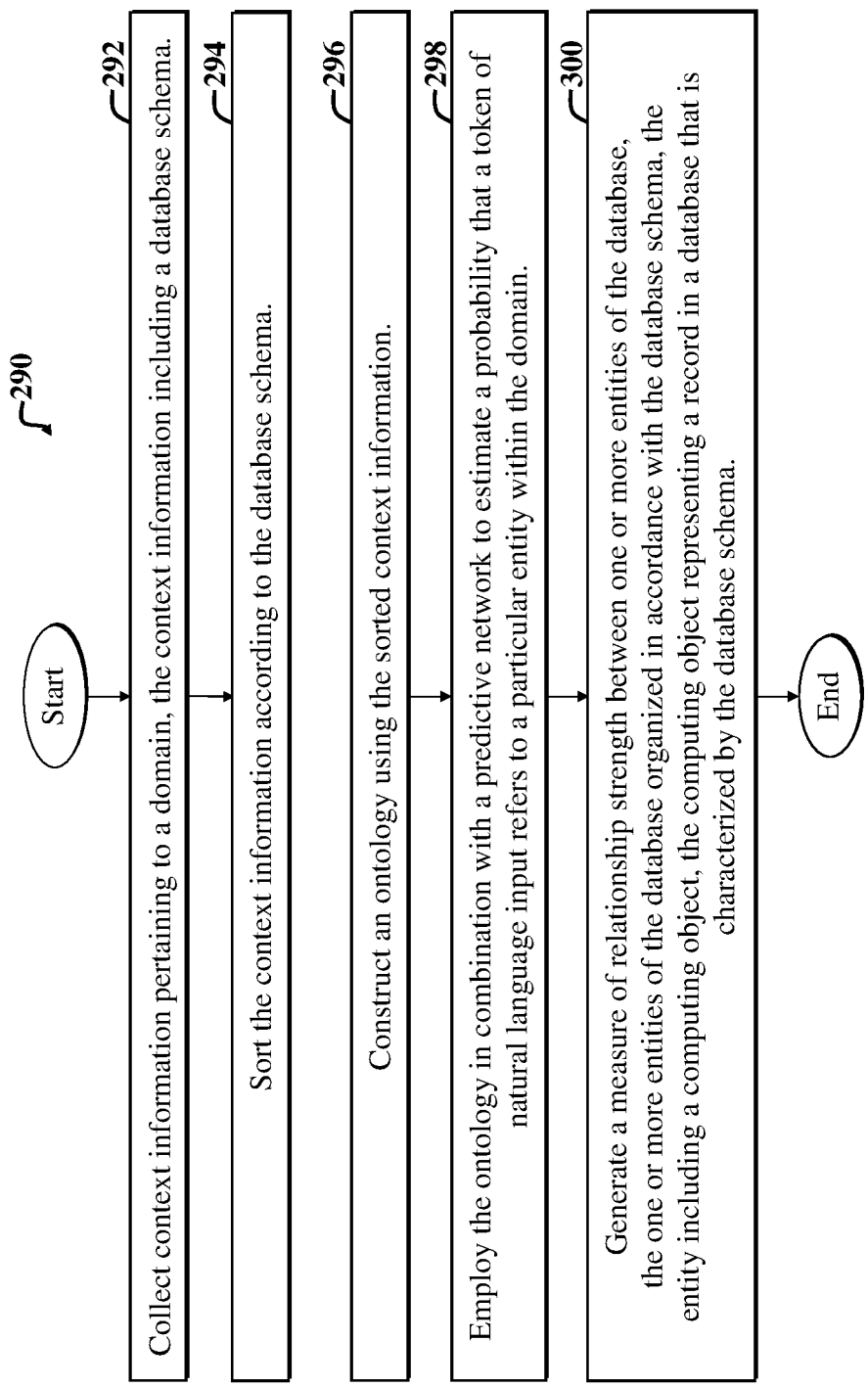
FIG. 9 is a flow diagram of a second example method suitable for use with the embodiments of FIGS. 1-8.

FIG. 9 is a flow diagram of a second example method 290 suitable for use with the embodiments of FIGS. 1-8. The second example method 290 is a generalized method facilitates machine interpretation of input tokens not limited to natural language words or phrases.

The second example method 290 includes an initial context collection step 292, which involves collecting context information pertaining to a domain, the context information including a database schema.

Next, a context-sorting step 294 includes sorting the context information in accordance with the database schema, resulting in sorted context. Context is said to be sorted if it is arranged and linked with associations or edges.

Subsequently, an ontology-constructing step 296 includes using the sorted context to construct an ontology.

Next, an ontology-employing step 298 includes employing the ontology in combination with a predictive network to estimate a probability that a token of natural language input refers to a particular entity within the domain.

Finally, a relationship strength-determining step 300 includes generating a measure of relationship strength (e.g., total distance D or inversely related relevancy R) between two or more entities of the database. The two or more entities of the database organized in accordance with the database schema.

The method 290 may be modified, without departing from the scope of the present teachings. For example, the method 290 may further specify that the entity includes a computing object that represents a record in a database, where the database is characterized by the database schema.

The context-sorting step 294 may further include separating context into two or more groups of context, where the two or more groups of context include a first group of context that includes context that is not applicable to interpreting a meaning of the token of natural language input. The two or more groups of context including a second group of context that includes context estimated to be applicable to interpreting the meaning of the token of natural language input.

The ontology may characterize one or more semantic relationships between a user and one or more other entities of the domain. The ontology may further characterize strengths of the one or more semantic relationships.

The ontology-employing step 298 may further include filtering the sorted context based on the token, resulting in filtered context; and using the filtered context and strengths as input to a predictive network. The predictive network may include a Bayes network. Alternatively or in addition, the predictive network may include a maximum entropy network. The predictive network may be configured to estimate a probability that the token of the natural language input refers to a particular entity of the domain. The token may include a natural language word or phrase.

In an alternative illustrative method, first, a database schema and knowledge of a domain enables the creation of an ontological model (i.e., ontology), which includes entities and relationships (e.g. Sales Person, Oppty, Lead, Account, isOwnerOf, isAccountOf, isColleagueOf). Next, the ontological model is then populated with data from a particular database and from data made available by the user (through his/her devices). This enables, for example, instantiation of a Sales Person entity called 'Lisa Jones' who works for the Company 'X' and has an Oppty at 'XYZ'. Now, input (e.g., natural language input) is then accepted from the user. Note that the input could take forms (e.g., gestures) other than natural language. The natural language input is then parsed and classified into possible entities within the ontology. In some cases, there will be only one choice, but in other cases, several possible candidates will exist within the ontology. In order to resolve this ambiguity, the strengths of the relationships between candidate entities are used to generate a probability network (Bayes network), which is then used to calculate probabilities of the most likely candidate entity (being referred to) for each ambiguous input token.

In summary, such an alternative method may include constructing an ontological model based on domain and database schema; populating the ontological model with data from the database and contextual information made available by the user; parsing and classifying user input, mapping the results to candidate entities within the ontology; and resolving any ambiguities in this mapping by using the relationships between candidate entities to generate a probability network.

Figure 10:
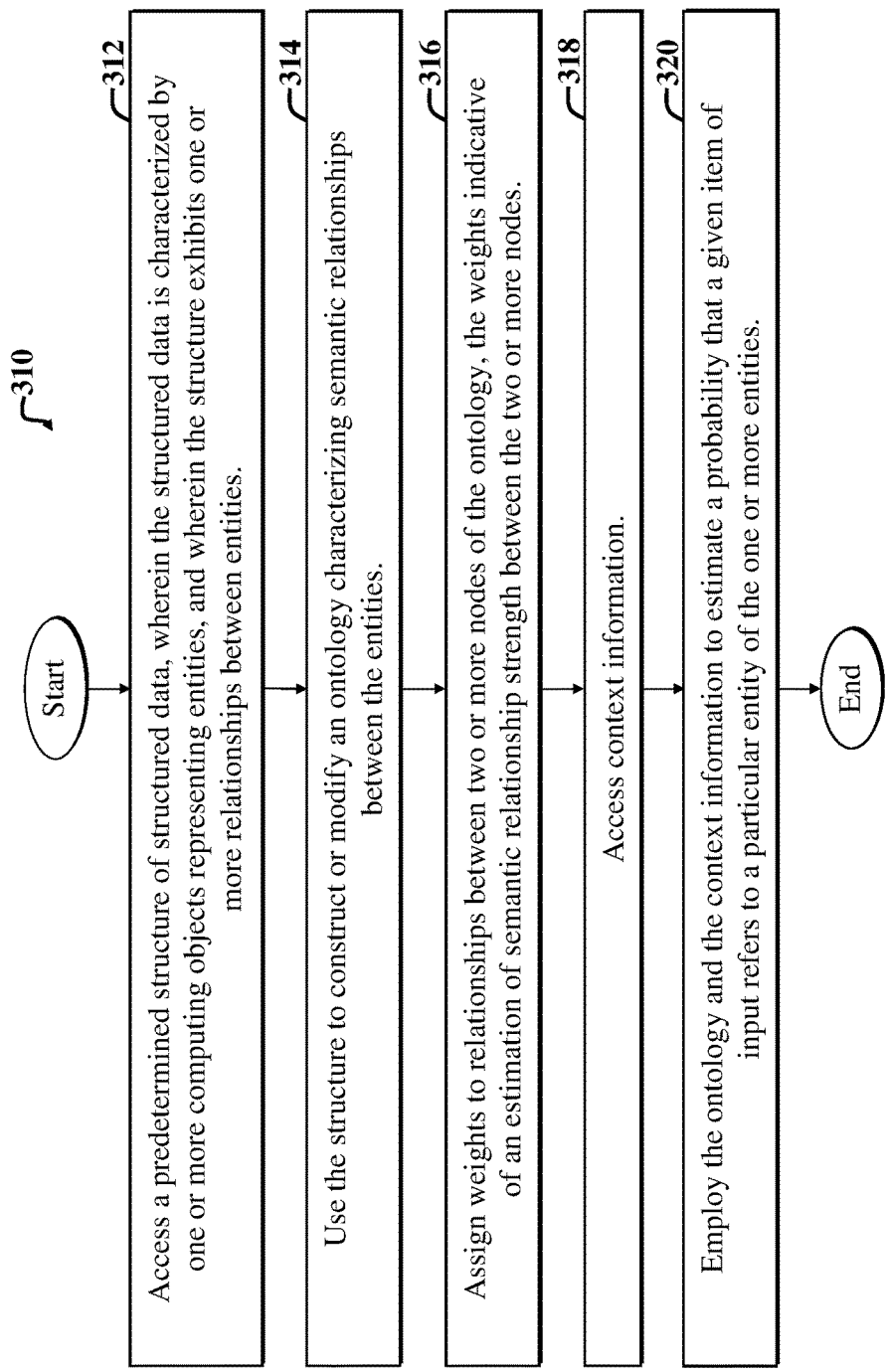
FIG. 10 is a flow diagram of third example method suitable for use with the embodiments of FIGS. 1-9.

FIG. 10 is a flow diagram of third example method 310 suitable for use with the embodiments of FIGS. 1-9. The third example method 310 facilitates machine interpretation of potentially ambiguous input, e.g., natural language input.

The third example method 310 includes a first step 312, which involves accessing a predetermined structure of a structured data. The structured data is characterized by one or more computing objects representing entities. The structure may exhibit or characterize one or more relationships between entities.

A second step 314 includes using the structure to construct or modify an ontology characterizing semantic relationships between the entities.

A third step 316 includes assigning weights to relationships between two or more nodes of the ontology, the weights indicative of an estimation of semantic relationship strength between the two or more nodes.

A fourth step 318 includes accessing context information.

A fifth step 320 includes employing the ontology and the context information to estimate a probability that a given item of input refers to a particular entity of the one or more entities.

The third example method 310 may be modified, without departing from the scope of the present teachings. For example, the method 310 may further specify that the entities include one or more business transactions.

The fifth step 320 may further include using a Bayes network in combination with the ontology and weights to calculate the estimate of the probability. The item of input may include a word or phrase of natural language input. The context information may include location information associated with each entity. The one or more nodes of the ontology may represent words or phrases that correspond to the one or more entities of the database. The structured arrangement of data may include a relational database, where the structure is defined by schema of the relational database.

Note that additional related methods within the scope of embodiments discussed herein are possible. For example, another method includes generating an ontology based on relationships in the CRM; parsing the sentence structure using a trained recognizer; identifying named entity types using the trained recognizer; using a Bayes network to calculate probabilities based on the ontology and contextual hints; and using one or more APIs and JavaScript Object Notation (JSON) language to facilitate passing data between entities or resources of a network.

Another alternative example method for facilitating machine interpretation of a token includes receiving the input token; obtaining metadata associated with the input token; using the input token and a node of an ontology corresponding to the input token as a starting position in the ontology for a probability calculation; determining one or more paths to a candidate token for association with the input token; ascertaining aggregate weights of each of the one or more paths; and employing a predictive network in combination with the ontology and the aggregate weights of each path to determine a likelihood that the input token refers to the candidate token. Note that other approaches, including approaches involving use of neural networks for classification and decision making aspects of embodiments, may be employed without departing from the scope of the present teachings.

The metadata may include or represent context information (for resolving input token meaning ambiguity). The context information may include, for example, location information. The location information may represent a location of a user of a software UI used to provide the input token.

The alternative example method may further include including employing a database schema to construct the ontology. The database schema may include a CRM database schema. The ontology may specify semantic relationships between entities of a database from which the database schema is derived.

The alternative example method may further include applying a relationship strength as a weight applied to each path between each node of the ontology. Note that the context information may be included as one or more nodes of the ontology. The context information may further include location information that identifies an approximate location of a UI used by a user to provide the input token. The likelihood estimated by the Bayes network may be used to determine a suggestion for a software action.

Note that certain embodiments discussed herein may act as filtering mechanisms, where the filtering criteria the criteria include the context and the schema then you're using educated calculations to implement the filtering or at least facilitate identification of the most likely meaning of a particular input token.

Note that various embodiments discussed herein may be further adapted or augmented to incorporate learning (e.g., adaptation based on different user input and/or changing context); to incorporate user feedback to augment context over time; to incorporate user feedback to adjust weights of an ontology over time, and so on. Note that various ontology path weights (d) can be conditional and can vary or evolve, e.g., based on additional or new context information. In general, such embodiments may gleam information from patterns of personal use by particular users; then use that information to improve efficiency and accuracy of associated systems.

Although the description has been described with respect to particular embodiments thereof, these particular embodiments are merely illustrative, and not restrictive. For example, while various embodiments are discussed herein with reference to machine interpretation of natural language using a database schema derived ontology and a Bayes network, embodiments are not limited thereto. For example, input other than natural language input, may require resolution of implicit references therein. Those skilled in the art with access to the present teachings may readily implement an embodiment to handle input other than natural language input (e.g., inputs generated via one or more software processes) to resolve implicit references in the input in accordance with the present teachings.

Note that while various embodiments discussed herein address natural language parsing as an input mechanism, the precise nature of the input channel is ancillary and may vary depending upon the needs of a given implementation. In general, implementations of embodiments may accept input 'tokens' in various forms (whether it be spoken words, typed text, or even gestures) and then classify and map the input tokens to entities within a database using an ontological model along with a Bayes network, thereby facilitating inferring user intent.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set fourth. Therefore, many modifications may be made to adapt a particular situation or material to the essential scope and spirit.

We claim:

1. A method for facilitating machine interpretation of language input, the method comprising:

automatically constructing a schema-ontology with reference to implicit sematic relationships of a database schema, the schema-ontology including one or more indications of relationship strength characterizing two or more entities of the schema-ontology;

collecting context information pertaining to a domain;

receiving the language input;

determining an estimation of a meaning of the language input based on the language input and the schema-ontology by using:

the context information;

the one or more indications of the relationship strength; and an estimation of a probability that one or more portions of the language input refer to a particular entity, wherein the one or more portions of the language input include an ambiguity, wherein the estimation of the probability is generated based on the language input and the schema-ontology, and the estimation of the probability includes an estimation of the ambiguity and wherein the estimation of the probability is further generated by illustrating the schema-ontology graphically as a network diagram with nodes representing portions of data and semantic relationships between the nodes; augmenting structure of the schema-ontology with relationship strength values characterizing the semantic relationships between the nodes; using relationship strength values by a probability network, wherein the relationship strength values are along paths between the nodes, wherein a particular path of the paths includes associations between a subset of three or more of the nodes, wherein each of the associations is associated with a respective weight that is scaled by a respective individual multiplier; and generating the estimation of the probability based at least in part on the weights associated with the associations;

generating the machine interpretation of the language input based on the meaning and based on the estimation of the meaning including the estimation of the ambiguity;

selecting a software action that is responsive to the machine interpretation of the language input; and implementing the software action based on the machine interpretation of the language input.

2. The method as recited by claim 1, wherein the language input is selected from a group consisting of speech, representation of speech, written, text, email, gesture, electronic representation, and commands generated based on user interaction with a user interface.

3. The method as recited by claim 1, wherein the one or more portions of the language input include one or more of a word, a phrase, and a subset of the language input.

4. The method as recited by claim 1, wherein the language input is associated with an opportunity, the opportunity is associated with additional information including location information, and the additional information is fed to a rule-based expert system trained to make suggestions as to what a user wishes to accomplish next.

5. The method as recited by claim 1, wherein the method further comprises:

augmenting structure of the schema-ontology with the relationship strength values characterizing the semantic relationships between the nodes; and adjusting the relationship strength values of the semantic relationships based on the context information, wherein a relationship strength value is a metric estimating how closely two nodes of the network diagram are related.

6. The method as recited by claim 1, wherein semantic distances are inversely related to relevancy and relationship weights, wherein a smaller relationship weight between two nodes of the network diagram represents a stronger and more relevant relationship between the two nodes of the network diagram.

7. The method as recited by claim 6, wherein the method further comprises:
adjusting the relationship weights as context information changes.

8. The method as recited by claim 1, wherein context information associated with a particular word of the language input includes all available information associated with the particular word other than definition of the particular word.

9. The method as recited by claim 1, wherein the method further comprises:
parsing and classifying the language input into tokens for words and phrases in the language input;
using information characterizing a user who provided the language input as a starting reference point in the schema-ontology, wherein the starting reference point is one of the nodes associated with the schema-ontology;
using the starting reference point to calculate relevancy of a particular reference; and
using a Bayes network to calculate probability that a given token refers to a particular entity identified in the schema-ontology, wherein the probability for the given token is associated with relevancy.

10. The method as recited by claim 1, wherein the context information includes global position system (GPS) information, appointments, user name, address, user enterprise access permissions, environmental state, time, date, available meeting spaces, recently browsed websites, frequency of access to particular database object, particular database transaction, inferred opportunity, explicit context, stated user name, stated address, stated opportunity, stated task, implicit context, user job role, and project, and wherein the method further comprises:
using the context information to develop additional context describing one or more inferences.

11. A non-transitory processor-readable storage device including instructions executable by a digital processor, wherein the instructions implement a method for facilitating machine interpretation of language input, the method comprising:
automatically constructing a schema-ontology with reference to implicit sematic relationships of a database schema, the schema-ontology including one or more indications of relationship strength characterizing two or more entities of the schema-ontology;
collecting context information pertaining to a domain;
receiving the language input;
determining an estimation of a meaning of the language input based on the language input and the schema-ontology by using:
the context information;
the one or more indications of the relationship strength; and
an estimation of a probability that one or more portions of the language input refer to a particular entity, wherein the one or more portions of the language input include an ambiguity, wherein the estimation of the probability is generated based on the language input and the schema-ontology, and the estimation of the probability includes an estimation of the ambiguity and wherein the estimation of the probability is further generated by illustrating the schema-ontology graphically as a network diagram with nodes representing portions of data and semantic relationships between the nodes; augmenting structure of the schema-ontology with relationship strength values characterizing the semantic relationships between the nodes; using relationship strength values by a probability network, wherein the relationship strength values are along paths between the nodes, wherein a particular path of the paths includes associations between a subset of three or more of the nodes, wherein each of the associations is associated with a respective weight that is scaled by a respective individual multiplier; and generating the estimation of the probability based at least in part on the weights associated with the associations;
generating the machine interpretation of the language input based on the meaning and based on the estimation of the meaning including the estimation of the ambiguity;
selecting a software action that is responsive to the machine interpretation of the language input; and
implementing the software action based on the machine interpretation of the language input.

12. The non-transitory processor-readable storage device as recited by claim 11, wherein the language input is selected from a group consisting of speech, representation of speech, written, text, email, gesture, electronic representation, and commands generated based on user interaction with a user interface.

13. The non-transitory processor-readable storage device as recited by claim 11, wherein the one or more portions of the language input include one or more of a word, a phrase, and a subset of the language input.

14. The non-transitory processor-readable storage device as recited by claim 11, wherein the language input is associated with an opportunity, the opportunity is associated with additional information including location information, and the additional information is fed to a rule-based expert system trained to make suggestions as to what a user wishes to accomplish next.

15. The non-transitory processor-readable storage device as recited by claim 11, wherein the method further comprises:
augmenting structure of the schema-ontology with the relationship strength values characterizing the semantic relationships between the nodes; and
adjusting the relationship strength values of the semantic relationships based on the context information, wherein a relationship strength value is a metric estimating how closely two nodes of the network diagram are related.

16. The non-transitory processor-readable storage device as recited by claim 11, wherein semantic distances are inversely related to relevancy and relationship weights, wherein a smaller relationship weight between two nodes of the network diagram represents a stronger and more relevant relationship between the two nodes of the network diagram.

17. The non-transitory processor-readable storage device as recited by claim 16, wherein the method further comprises:
adjusting the relationship weights as context information changes.

18. The non-transitory processor-readable storage device as recited by claim 11, wherein context information associated with a particular word of the language input includes all available information associated with the particular word other than definition of the particular word.

19. The non-transitory processor-readable storage device as recited by claim 11, wherein the method further comprises:
- parsing and classifying the language input into tokens for words and phrases in the language input;
- using information characterizing a user who provided the language input as a starting reference point in the schema-ontology, wherein the starting reference point is one of the nodes associated with the schema-ontology;
- using the starting reference point to calculate relevancy of a particular reference; and
- using a Bayes network to calculate probability that a given token refers to a particular entity identified in the schema-ontology, wherein the probability for the given token is associated with relevancy.

20. An apparatus for facilitating machine interpretation of language input, the apparatus comprising:
- one or more hardware processors;
- one or more non-transitory processor-readable storage device including instructions executable by the one or more hardware processors for:
- automatically constructing a schema-ontology with reference to implicit sematic relationships of a database schema, the schema-ontology including one or more indications of relationship strength characterizing two or more entities of the schema-ontology;
- collecting context information pertaining to a domain;
- receiving the language input;
- determining an estimation of a meaning of the language input based on the language input and the schema-ontology by using:
- the context information;
- the one or more indications of the relationship strength; and
- an estimation of a probability that one or more portions of the language input refer to a particular entity, wherein the one or more portions of the language input include an ambiguity, wherein the estimation of the probability is generated based on the language input and the schema-ontology, and the estimation of the probability includes an estimation of the ambiguity and wherein the estimation of the probability is further generated by illustrating the schema-ontology graphically as a network diagram with nodes representing portions of data and semantic relationships between the nodes; augmenting structure of the schema-ontology with relationship strength values characterizing the semantic relationships between the nodes; using relationship strength values by a probability network, wherein the relationship strength values are along paths between the nodes, wherein a particular path of the paths includes associations between a subset of three or more of the nodes, wherein each of the associations is associated with a respective weight that is scaled by a respective individual multiplier; and generating the estimation of the probability based at least in part on the weights associated with the associations;
- generating the machine interpretation of the language input based on the meaning and based on the estimation of the meaning including the estimation of the ambiguity;
- selecting a software action that is responsive to the machine interpretation of the language input; and
- implementing the software action based on the machine interpretation of the language input.

* * * * *

UNITED STATES PATENT AND TRADEMARK OFFICE
CERTIFICATE OF CORRECTION

| | |
|---|---|
| PATENT NO. | : 11,347,783 B2 |
| APPLICATION NO. | : 17/039908 |
| DATED | : May 31, 2022 |
| INVENTOR(S) | : Kraus et al. |

It is certified that error appears in the above-identified patent and that said Letters Patent is hereby corrected as shown below:

In the Specification

In Column 1, Line 12, delete "fourth" and insert -- forth --, therefor.

In Column 1, Line 28, delete "fourth" and insert -- forth --, therefor.

In Column 5, Line 35, delete "devices/" and insert -- devices. --, therefor.

In Column 13, Line 2, delete "in in" and insert -- in --, therefor.

In Column 27, Line 62, delete "fourth." and insert -- forth. --, therefor.

Signed and Sealed this
Eighth Day of November, 2022

*Katherine Kelly Vidal*

Katherine Kelly Vidal
*Director of the United States Patent and Trademark Office*